(12) United States Patent
Morita et al.

(10) Patent No.: US 12,030,670 B2
(45) Date of Patent: Jul. 9, 2024

(54) AIRCRAFT INSPECTION SUPPORT DEVICE AND AIRCRAFT INSPECTION SUPPORT METHOD

(71) Applicant: SHIMADZU CORPORATION, Kyoto (JP)

(72) Inventors: Koji Morita, Kyoto (JP); Hiroshi Horikawa, Kyoto (JP); Hiroshi Yagi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 416 days.

(21) Appl. No.: 17/628,143

(22) PCT Filed: Jul. 19, 2019

(86) PCT No.: PCT/JP2019/028553
§ 371 (c)(1),
(2) Date: Jan. 18, 2022

(87) PCT Pub. No.: WO2021/014514
PCT Pub. Date: Jan. 28, 2021

(65) Prior Publication Data
US 2022/0281617 A1    Sep. 8, 2022

(51) Int. Cl.
*G06V 10/141* (2022.01)
*B64F 5/60* (2017.01)
(Continued)

(52) U.S. Cl.
CPC ............ *B64F 5/60* (2017.01); *G02B 27/0101* (2013.01); *G02B 27/017* (2013.01); *G06T 7/0006* (2013.01); *G06T 7/001* (2013.01); *G06T 17/10* (2013.01); *G06V 10/141* (2022.01); *G02B 2027/0138* (2013.01);
(Continued)

(58) Field of Classification Search
CPC ........................................................ B64F 5/60
See application file for complete search history.

(56) References Cited

U.S. PATENT DOCUMENTS

2009/0287427 A1   11/2009   Dubois et al.
2014/0184786 A1   7/2014   Georgeson et al.
(Continued)

FOREIGN PATENT DOCUMENTS

JP   2010281754 A   12/2010
JP   2014222246 A   11/2014
(Continued)

OTHER PUBLICATIONS

Written Opinion by the International Search Authority dated Sep. 10, 2021, for PCT application No. PCT/JP2019/028553, submitted with a machine translation.

*Primary Examiner* — Oneal R Mistry
(74) *Attorney, Agent, or Firm* — Muir Patent Law, PLLC

(57) ABSTRACT

This aircraft inspection support device (100) is provided with a three-dimensional model generation unit (25*a*), an inspection position acquisition unit (25*b*), and a control unit (25) configured to perform control to acquire an inspection result (50) of an inspection target (40) and cause the three-dimensional model position (55) on the three-dimensional model (52) corresponding to the inspection position (53), an inspection position (53), and an inspection result (50) to be stored in association with each other.

17 Claims, 14 Drawing Sheets

(51) Int. Cl.
*G02B 27/01* (2006.01)
*G06T 7/00* (2017.01)
*G06T 17/10* (2006.01)

(52) U.S. Cl.
CPC ............... *G02B 2027/014* (2013.01); *G06T 2207/30204* (2013.01); *G06T 2207/30252* (2013.01)

(56) References Cited

U.S. PATENT DOCUMENTS

| | | |
|---|---|---|
| 2018/0186475 A1 | 7/2018 | Garville |
| 2018/0275659 A1* | 9/2018 | Ono ................. B64U 20/87 |
| 2019/0033074 A1 | 1/2019 | Keda et al. |
| 2020/0175352 A1* | 6/2020 | Cha .................. G06N 3/04 |
| 2020/0312028 A1* | 10/2020 | Charvat ............. G05D 1/101 |

FOREIGN PATENT DOCUMENTS

| | | | |
|---|---|---|---|
| JP | 2017033429 A | 2/2017 |
| JP | 2017199263 A | 11/2017 |
| JP | 6415034 B2 | 10/2018 |
| JP | 2019028595 A | 2/2019 |

\* cited by examiner

AIRCRAFT INSPECTION SUPPORT DEVICE AND AIRCRAFT INSPECTION SUPPORT METHOD

TECHNICAL FIELD

The present invention relates to an aircraft inspection support device and an aircraft inspection support method.

BACKGROUND OF THE INVENTION

Conventionally, an aircraft inspection support device used when inspecting an inspection target is known. Such an aircraft inspection support device is disclosed, for example, in Japanese Patent No. 6,415,034.

In Japanese Patent No. 6,415,034, an aircraft inspection support device for inspecting damages on an aircraft is disclosed. According to the configuration disclosed in the above-described Japanese Patent No. 6,415,034, an image captured by imaging a predetermined region of an aircraft is acquired. Then, the acquired image is compared with a reference image to determine whether or not there is an abnormality in the acquired image. In a case where an abnormality is found in the acquired image, a detailed inspection on the damage is performed by a non-destructive inspection, such as, e.g., near-infrared spectroscopy. The above-described Japanese Patent No. 6,415,034 discloses a configuration of adjusting the orientation of the non-destructive inspection device, based on the azimuth angle and the elevation angle (the pan angle and the tilt angle) of the camera when acquiring an image at the time of performing the non-destructive inspection.

The aircraft inspection support device disclosed in the above-described Japanese Patent No. 6,415,034 specifies the inspection position by using the design data of the aircraft. The above-described Japanese Patent No. 6,415,034 discloses a configuration of storing digital recording in which the inspection position on the design data, the inspection result, and the image data are stored in association with each other in a computer memory.

PRIOR ART DOCUMENT

Patent Document

Patent Document 1: Japanese Patent No. 6,415,034

SUMMARY OF THE INVENTION

Problems to be Solved by the Invention

In the aircraft inspection support device disclosed in the above-described Japanese Patent No. 6,415,034, as described above, the inspection position is specified based on the design data. However, for example, thousands to tens of thousands of components used per aircraft, such as, e.g., rivets, for joining a plurality of plate materials, may not have been stored in detail one by one in the design data. Further, in a case where a shape of a certain component has been changed from the shape when produced, for example, when repairs or the like have been performed in maintenance or the like during the operation, the information on the component will not be stored in the design data. In these cases, it is difficult to associate the inspection position of the inspection target with the inspection result thereof.

The present invention has been made to solve the above-described problems. An object of the present invention is to provide an aircraft inspection support device and an aircraft inspection support method capable of storing an inspection position of an inspection target and an inspection result thereof in association with each other even in a case where inspection targets have not been stored in the design data of the aircraft.

Means for Solving the Problem

In order to attain the above-described object, an aircraft inspection support device according to the first aspect of the present invention is provided with:

a three-dimensional model generation unit configured to generate a three-dimensional model of a shape of an aircraft by acquiring shape data from a plurality of positions;

an inspection position acquisition unit configured to acquire an inspection position of an inspection target that is a component of the aircraft; and a control unit configured to perform control to acquire an inspection result of the inspection target and cause a three-dimensional model position on the three-dimensional model corresponding to the inspection position, the inspection position, and the inspection result to be stored in association with each other.

An aircraft inspection support method according to a second aspect of the present invention includes:

inspecting an inspection target that is a component of an aircraft;

acquiring an inspection result of the inspection target;

acquiring an inspection position of the inspection target; and storing a three-dimensional model position on the three-dimensional model corresponding to the inspection position, the inspection position, and the inspection result in association with each other.

Effects of the Invention

As described above, according to the first aspect of the present invention, there are provided with: a three-dimensional model generation unit configured to generate a three-dimensional model of a shape of an aircraft; and a control unit configured to perform control to cause a three-dimensional model position on the three-dimensional model corresponding to the inspection position, the inspection position, and the inspection result to be stored in association with each other. By providing the control unit, the inspection position of the inspection target and the inspection result thereof can be stored in association with each other even in a case where inspection targets have not been stored in the design data of the aircraft. Further, since the control unit is provided, the three-dimensional model position on the generated three-dimensional model corresponding to the inspection position, the inspection position, and the inspection result can be stored in association with each other. As a result, even in a case where inspection targets have not been stored in the design data of the aircraft, it is possible to store the inspection position and the inspection result in association with each other. Further, since the above-described control unit is provided, the inspector can confirm the inspection position on the three-dimensional model, which enables the inspector to grasp the inspection position three-dimensionally. As a result, as compared with the case in which the inspection position is confirmed on a two-dimensional model, for example, the inspection position can be grasped more intuitively. Further, since the control unit is provided, the inspection position and the inspection result can be stored in association with each other. Therefore, by accumulating data, it becomes possible to compare the data with previous data, which enables the inspector to grasp the change in the inspection result over time. As a result, by analyzing the inspection result together with the operational data, such as, e.g., the flight time and the flight cycle, it becomes possible to grasp the position to be intensively inspected and obtain useful information for preventive maintenance.

Further, according to the second aspect of the present invention, by configuring as described above, similarly to the aircraft inspection support device according to the first aspect of the present invention, it is possible to provide an aircraft inspection support method capable of storing the inspection position of the inspection target and the inspection result thereof in association with each other, even in a case where inspection targets have not been stored in the design data of the aircraft.

EMBODIMENTS FOR CARRYING OUT THE INVENTION

Hereinafter, some embodiments in which the present invention is embodied will be described with reference to the attached drawings.

Referring to FIG. 1 to FIG. 13, a configuration of an aircraft inspection support device 100 according to an embodiment of the present invention will be described.

Figure 1:
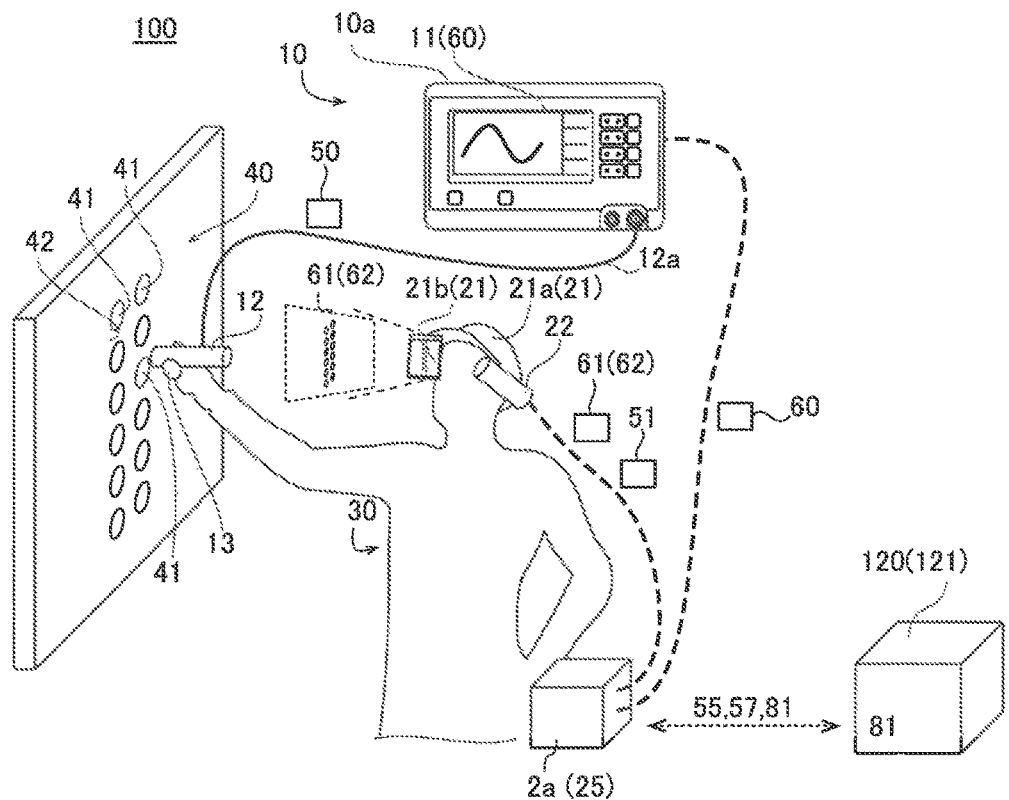
FIG. 1 is a schematic diagram showing a configuration of an aircraft inspection support device according to one embodiment.

As shown in FIG. 1, the aircraft inspection support device 100 according to one embodiment is configured as a device for supporting an inspector 30 that performs an inspection operation on an inspection target 40 by using an inspection unit 10 in the vicinity of an inspection target 40. Specifically, the inspection target 40 includes, for example, an object in which dents, defects, corrosion, cracks (cracking or fissures), abrasion, etc., occur in an aircraft. In this embodiment, the inspection target 40 is a rivet 41 for joining a plurality of plates 42 constituting a body of an aircraft and the plate 42. That is, the inspection target 40 is a rivet fastened portion and the vicinity thereof, and the plate 42. The vicinity of the inspection target 40 means, for example, a range of a position (a position accessible to the inspection target) where the inspector 30 can bring a measurement probe 12, which will be described later, into contact with the inspection target 40. Specifically, the vicinity of the inspection target 40 means, for example, a region including the inspection target 40 and the working position (scaffolding portion) facing the inspection target 40.

The distance between the plurality of rivets 41 is, for example, about 1 inch to a few inches. FIG. 1 illustrates an example in which the plurality of rivets 41 is arranged in a matrix on the plate 42. Thus, several thousand to tens of thousands of rivets 41 are provided per aircraft. Further, in this inspection, the inspector 30 inspects all of the rivets 41 for fatigue conditions of the rivets 41 and for cracking in the plate 42 using the inspection unit 10. The inspector 30 performs the inspection in a state in which, for example, the inspector is on a scaffold arranged along the fuselage of the aircraft.

Figure 2:
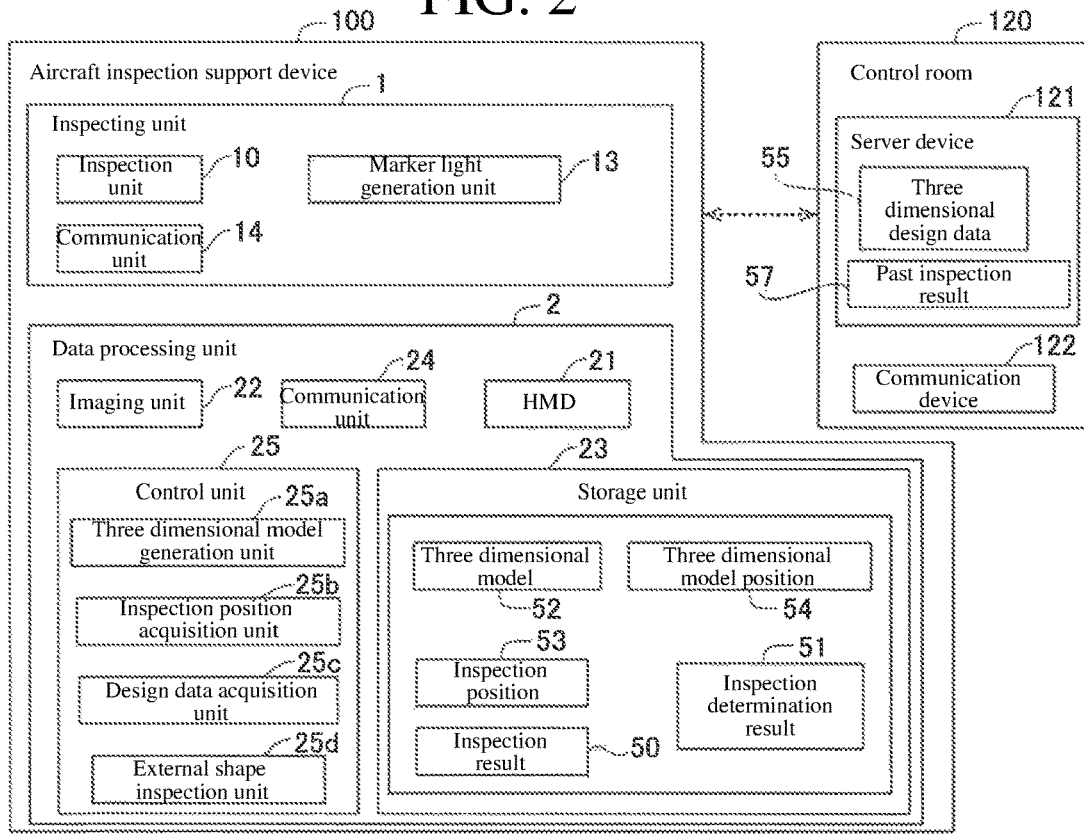
FIG. 2 is a block diagram showing the configuration of the aircraft inspection support device.

Further, the aircraft inspection support device 100 is configured as an information system for exchanging information (data) by radio communication or the like with a server device 121 provided in a control room 120. As shown in FIG. 2, the control room 120 is provided with a server device 121 and a communication device 122 when radio communication is performed.

The server device 121 is configured to store (manage and accumulate) the information (images, etc.) acquired from the aircraft inspection support device 100 via the communication device 122. Further, the server device 121 constructs a database based on the information (one data file 80, which will be described later) acquired from the aircraft inspection support device 100. This database is configured to be capable of comparing the information previously acquired from the aircraft inspection support device 100 with the newly acquired information.

The communication device 122 is configured to communicate wirelessly with the aircraft inspection support device 100.

The inspection unit 10 is configured to inspect the inspection target 40. The inspection unit 10 is configured as a device in which the inspector 30 performs a non-destructive inspection. In this embodiment, the inspection unit 10 is configured, for example, as an eddy current crack detection device or an ultrasonic inspection device. The inspection unit 10 is a specific measurement instrument corresponding to a maintenance manual prepared by the manufacturer of the aircraft or maintenance regulations of the aircraft maintenance company approved by the National Aviation Authority (e.g., the U.S. Federal Aviation Authority (FAA)) of each country.

As shown in FIG. 1, the inspection unit 10 includes an inspection unit body 10a, an inspection unit side display unit 11, and a measurement probe 12. The inspection unit body 10a includes a box-like housing. The inspection unit side display unit 11 is provided on one side surface of the inspection unit body 10a. The inspection unit side display unit 11 includes, for example, a liquid crystal display. The inspection unit side display unit 11 is configured to display an inspection result 50 from the measurement probe 12 as a measurement information image 60.

As shown in FIG. 1, the measurement probe 12 is connected to the inspection unit body 10a via a cable 12a and is configured to transmit the inspection result 50 to the inspection unit body 10a. The measurement probe 12 is configured to be capable of being griped by the inspector 30 and is formed in, for example, a pen-shape. The inspection result 50 is transmitted to the inspection unit body 10a as a digital signal.

(Configuration of Inspection Unit)

As shown in FIG. 2, the aircraft inspection support device 100 includes an inspecting unit 1 and a data processing unit 2. The inspecting unit 1 includes an inspection unit 10, a marker light generation unit 13, and a communication unit 14. The inspecting unit 1 is configured to perform a non-destructive inspection of the inspection target 40.

Figure 6:
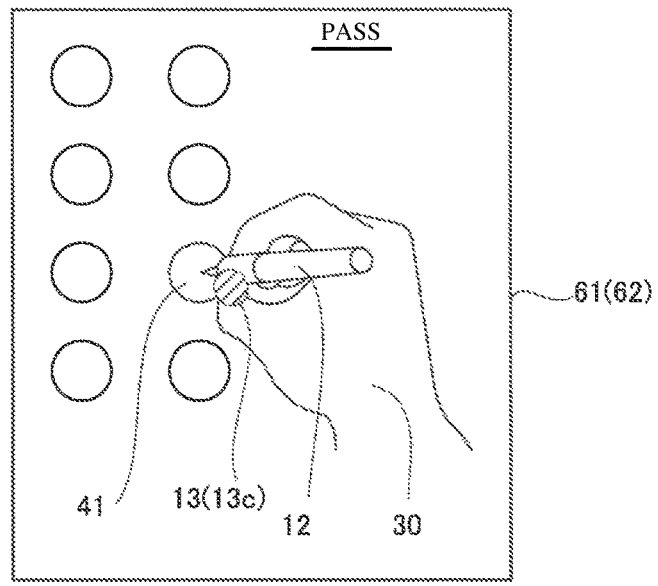
FIG. 6 is a schematic diagram of an inspection image in which first marker light is emitted.

The marker light generation unit 13 is configured to irradiate or emit marker light indicative of the inspection position 53 when confirming the inspection result 50 and capturing the inspection image 61 (see FIG. 6). The detailed configuration of the marker light generation unit 13 will be described later.

The communication unit 14 is configured to transmit the inspection result 50 acquired by the inspection unit 10 to the communication unit 24 of the data processing unit 2 as a radio signal. For example, the measurement information image 60 is continuously transmitted to the communication unit 24 as a moving image.

(Configuration of Data Processing Unit)

As shown in FIG. 2, the data processing unit 2 includes a head-mounted display (hereinafter referred to as "HMD") 21, an imaging unit 22, a storage unit 23, a communication unit 24, and a control unit 25. The storage unit 23, the communication unit 24, and the control unit 25 are arranged in a controller box 2a (see FIG. 1). The data processing unit 2 is configured to perform processing for associating the inspection result 50 of the inspection target 40 and the inspection position 53.

As shown in FIG. 1, the controller box 2a is configured to be carried or worn by the inspector 30. For example, the controller box 2a is configured to be worn using a belt or the like on the waist of the inspector 30.

The HMD 21 as a display unit is configured to display an image 62 (see FIG. 6) reflected in the visual range of the inspector 30. In this embodiment, the HMD 21 is configured as a HMD 21 displaying the inspection region including the inspection target 40 and the inspection position 53 on the inspection target 40. That is, the aircraft inspection support device 100 is configured as an HMD system.

The HMD 21 is configured to be mounted on the head of the inspector 30 to display the inspection image 61 of the inspection target 40 captured by the imaging unit 22 or the image 62 reflected in the visual range of the inspector 30. The HMD 21 includes an HMD mounting member 21a. The HMD mounting member 21a is, for example, formed in a belt shape to be attached to the head of the inspector 30 or is formed in a helmet shape (see FIG. 1). The image 62 reflected in the visual range of the inspector 30 includes, for example, the images of the plurality of rivets 41 and the image of the plate 42.

The HMD 21 includes a display screen 21b. The display screen 21b includes, for example, a liquid crystal display. As shown in FIG. 1, the display screen 21b of the HMD 21 is fixed to the HMD mounting member 21a and disposed between the eyes of the inspector 30 and the inspection target 40. The display screen 21b is formed in, for example, a visor shape. At the time of inspection, the display screen 21b can make the inspector 30 visually recognize a scene (a scene of a region corresponding to the image 62 reflected in the visual range of the inspector 30) visually recognized through the display screen 21b and the inspection result 50 displayed on the display screen 21b, in a superimposed manner. For example, the HMD 21 is configured to display the inspection result 50 in a semi-transparent manner in a partial region of the display screen 21b.

Further, the HMD 21 is configured to display (project) the inspection image 61 captured by the imaging unit 22 or the image 62 reflected in the visual range of the inspector 30, etc., on the display screen 21b. With this, the inspector 30 can directly confirm the inspection image 61 projected on the HMD 21 or the image 62 reflected in the visual range of the inspector 30. Therefore, it is possible for the inspector 30 to correct the orientation and/or the arrangement position of the imaging unit 22, depending on the situation.

The imaging unit 22 is mounted on the head of the inspector 30 and is configured as a so-called wearable camera. The imaging unit 22 is fixed to the HMD mounting member 21a. Thus, the HMD 21 is configured to be capable of mounting the imaging unit 22 on the head of the inspector 30 via the HMD mounting member 21a.

The imaging unit 22 is provided with, for example, an optical component (e.g., a lens) and an image sensor. Further, the imaging unit 22 is configured to image the inspection target 40. Specifically, the imaging unit 22 is configured to capture the image 62 in the visual range of the inspector 30. At the time of inspection, the imaging unit 22 is configured to capture the image 62 in the visual range of the inspector 30 as an inspection image 61 acquired by imaging the region including the inspection target 40.

Further, the imaging unit 22 is configured to be capable of performing wireless communication (or wired communication) with the control unit 25 via the communication unit 24. The imaging unit 22 is configured to transmit the captured image 62 reflected in the visual range of the inspector 30 to the control unit 25 via the communication unit 24 as, for example, a moving image. The imaging unit 22 is configured to acquire the inspection image 61, a plurality of images 63 (see FIG. 3) for generating a three-dimensional model 52 (see FIG. 4), and the image 62 reflected in the visual range of the inspector 30.

The storage unit 23 is configured as a nonvolatile memory. The storage unit 23 is configured to store the three-dimensional model 52, which will be described later, the inspection position 53, and the inspection result 50, based on a command from the control unit 25. The storage unit 23 is storing various programs to be executed by the control unit 25. The storage unit 23 is configured to be detachable with respect to the controller box 2a. For example, the storage unit 23 is configured as an SD-card (registered mark). The storage unit 23 may be directly connected to the controller box 2a, or may be externally connected to the controller box 2a via a cable. That is, the storage unit 23 is a removable medium (portable storage medium).

The communication unit 24 is configured to be capable of performing wireless communication with the communication unit 14 and is also configured to be capable of performing wireless communication with the imaging unit 22. The communication unit 24 is configured to be capable of performing wireless communication with the communication device 122 of the control room 120.

(Configuration of Control Unit)

The control unit 25 is configured to control each unit of the aircraft inspection support device 100. The control unit 25 is configured to perform control to acquire the inspection result 50 of the inspection target 40 and cause the three-dimensional model position 54 on the three-dimensional model 52 corresponding to the inspection position 53, the inspection position 53, and the inspection result 50 to be stored in association with each other. For example, the control unit 25 includes a central processing unit (CPU: Central Processing Unit) and an image processing unit (GPU: Graphics Processing Unit). The inspection result 50 is measured data of the inspection target 40 acquired by the inspection unit 10.

In this embodiment, as shown in FIG. 2, the control unit 25 includes a three-dimensional model generation unit 25a, an inspection position acquisition unit 25b, a design data acquisition unit 25c, and an external shape inspection unit 25d. Note that the control unit 25 functions as the three-dimensional model generation unit 25a, the inspection position acquisition unit 25b, the design data acquisition unit 25c, and the external shape inspection unit 25d by executing various programs stored in the storage unit 23. The inspection position 53 is a position where the inspection target 40 is inspected and includes the three-dimensional position coordinate. The three-dimensional model position 54 also includes a three-dimensional position coordinate indicating the position on the three-dimensional model 52.

The three-dimensional model generation unit 25a is configured to generate the three-dimensional model 52 of the shape of the aircraft by acquiring the shape data from a plurality of positions. In this embodiment, the three-dimensional model 52 includes the shape information on the aircraft and is generated based on the images 63 acquired by the imaging unit 22. The detailed configuration in which the three-dimensional model generation unit 25a generates the three-dimensional model 52 will be described later.

The inspection position acquisition unit 25b is configured to acquire the inspection position 53 where the inspection target 40 is inspected. The inspection position 53 is a position where the inspection is performed on the inspection target 40 and includes the three-dimensional position coordinate. The detailed configuration in which the inspection position acquisition unit 25b acquires the inspection position 53 will be described later.

The design data acquisition unit 25c acquires the three-dimensional design data 56 in the inspection region including at least the inspection target 40. Specifically, the design data acquisition unit 25c is configured to acquire in advance the three-dimensional design data 56 stored in the server device 121.

The external shape inspection unit 25d is configured to inspect the state change in the external shape of the inspection target 40 based on at least the three-dimensional model 52. The detailed configuration in which the external shape inspection unit 25d inspects the state change in the external shape of the inspection target 40 will be described later.

(Three-Dimensional Model)

Next, referring to FIG. 3 and FIG. 4, the configuration in which the three-dimensional model generation unit 25a in this embodiment generates the three-dimensional model 52 will be described.

Figure 3:
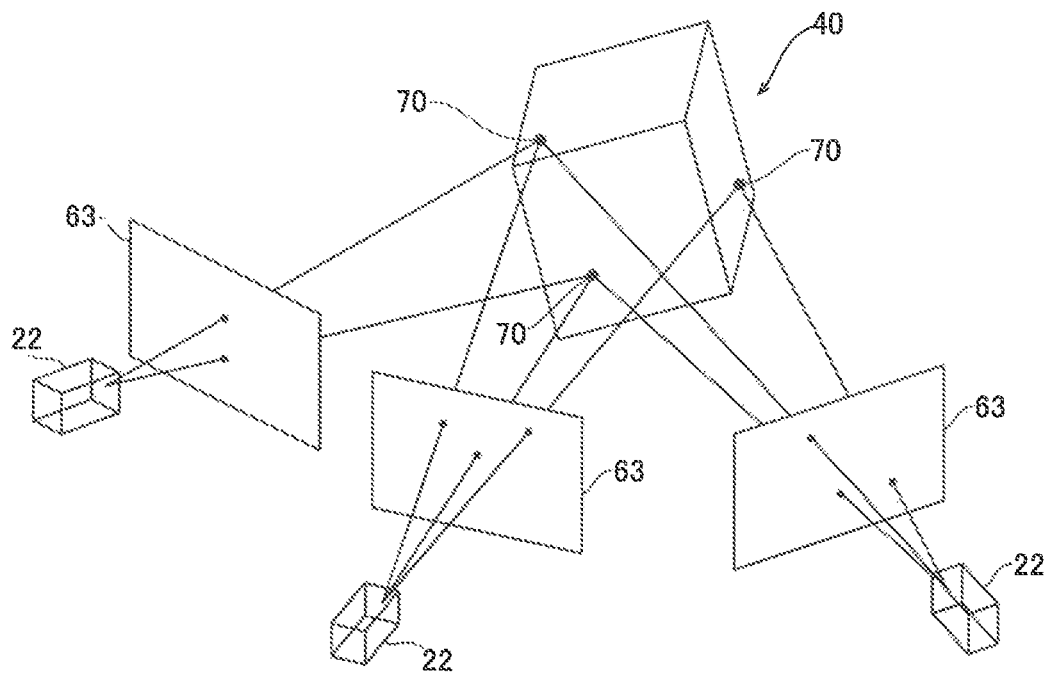
FIG. 3 is a schematic diagram for explaining how a three-dimensional model generation unit generates a three-dimensional model.

As shown in FIG. 3, the three-dimensional model generation unit 25a is configured to generate the three-dimensional model 52 based on a plurality of images 63 captured while changing the imaging position. The three-dimensional model generation unit 25a is configured to generate the three-dimensional model 52 using a so-called Visual SLAM (Simultaneous Localization and Mapping). Specifically, the three-dimensional model generation unit 25a images the inspection target 40 while changing the position of the imaging unit 22. The inspection target 40 includes a plurality of feature points 70, and the position of the feature point 70 in the image 62 changes depending on the imaging position. The three-dimensional model generation unit 25a generates the three-dimensional model 52, based on the positional relation of the feature points 70 reflected in the plurality of images 63 captured while changing the imaging position. That is, the three-dimensional model 52 is a three-dimensional map of the aircraft acquired by inferring the three-dimensional position coordinate of each feature point 70 from the positional relation of each feature point 70 in the plurality of images 63.

Figure 4:
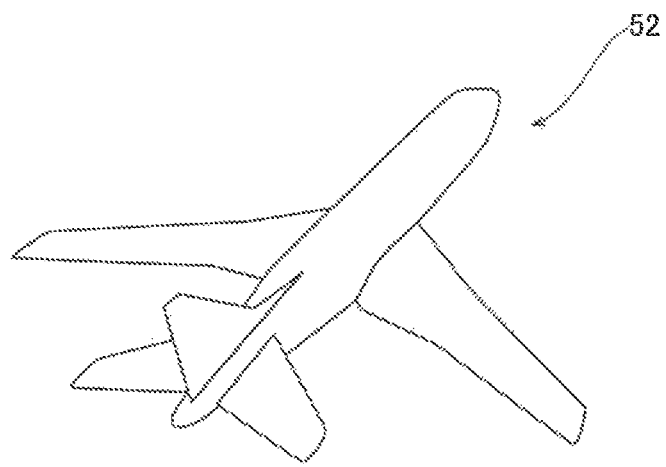
FIG. 4 is a schematic diagram of a three-dimensional model of an aircraft generated by the three-dimensional model generation unit.

FIG. 4 is a schematic diagram of the three-dimensional model 52 generated by the three-dimensional model generation unit 25a. In this embodiment, the three-dimensional model 52 of the aircraft is generated and stored in advance in the storage unit 23 prior to the inspection by the inspection unit 10.

(Marker Light Generation Unit)

Figure 5:
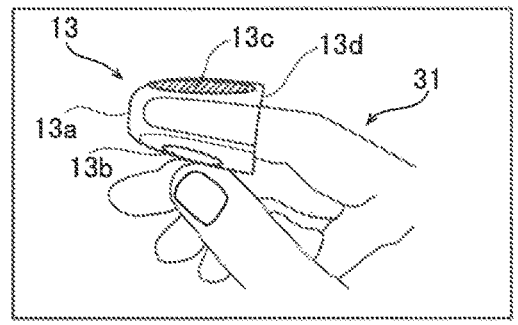
FIG. 5 is a schematic diagram of a marker light generation unit.
Figure 7:
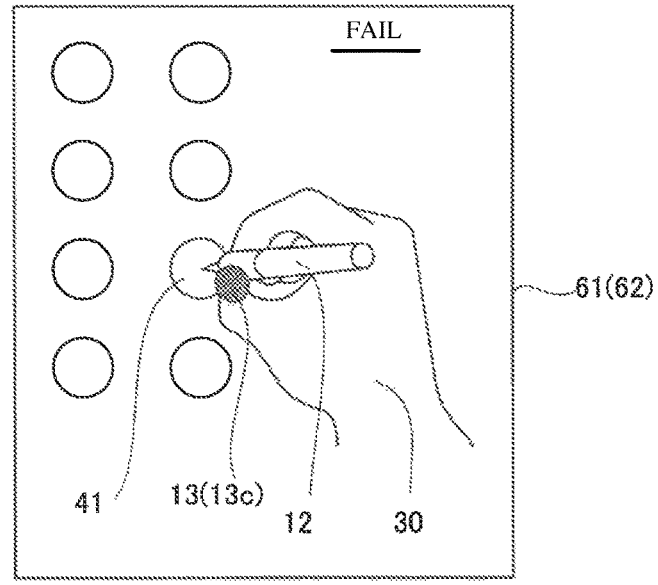
FIG. 7 is a schematic diagram of an inspection image in which second marker light is emitted.

Next, referring to FIG. 5 to FIG. 7, the configuration of the marker light generation unit 13 and the irradiation method of marker light by the marker light generation unit 13 will be described.

The marker light generation unit 13 includes a housing 13a, a switch 13b, and a light-emitting portion 13c. The housing 13a is provided with an opening 13d through which a finger 31 of the inspector 30 is inserted. The marker light generation unit 13 is configured such that when the switch 13b is pressed, marker light is emitted from the light-emitting portion 13c at the inspection position 53 of the inspection target 40. The light-emitting portion 13c includes, for example, an LED (Light Emitting Diode).

As shown in FIG. 6, the inspector 30 grips the measurement probe 12 with the marker light generation unit 13 attached to the finger 31 (finger) and inspects the inspection target 40. The marker light generation unit 13 is configured to be capable of emitting at least first marker light indicating that the inspection target has passed the inspection and second marker light indicating that the inspection target has failed the inspection at the inspection position 53 of the inspection target 40. In this embodiment, the marker light generation unit 13 is configured such that the emission color of the first marker light and the emission color of the second marker light are differentiated from each other. Thus, the inspector 30 can identify the inspection result 50.

FIG. 6 is a schematic diagram showing the inspection image 61 (image 62 reflected in the visual range) when the inspector 30 caused the first marker light to be emitted. That is, the example shown in FIG. 6 shows the inspection image 61 (the image 62 reflected in the visual range) when the inspection target has passed the inspection. FIG. 7 is a schematic diagram showing the inspection image 61 (image 62 in the visual range) when the inspector 30 caused the second marker light to be emitted. That is, FIG. 7 is a schematic diagram of the inspection image 61 (image 62 in the visual range) when the inspection target has failed the inspection. The inspector 30 causes the first marker light or the second marker light to be emitted based on the inspection result 50. Specifically, the inspection result 50 acquired when the inspection target 40 (rivet 41) is inspected by the measurement probe 12 is displayed on the HMD 21. The inspector 30 selects the first marker light or the second marker light based on the inspection result 50 displayed on the HMD 21 to cause the selected marker light to be emitted. In the examples shown in FIG. 6 and FIG. 7, the difference between the light emission color of the first marker light and the light emission color of the second marker light is illustrated by hatching.

Further, in this embodiment, the inspection position acquisition unit 25b is configured to acquire the inspection position 53 by acquiring the position of the marker light reflected in the inspection image 61.

(Association of Three-Dimensional Model, Inspection Position, Inspection Result, and Inspection Determination Result)

In this embodiment, the control unit 25 is configured to perform control to associate the inspection position 53 of the inspection target 40 with the three-dimensional model position 54 and stores the three-dimensional model 52 in which the three-dimensional model position 54 and the inspection position 53 are associated with each other in the storage unit 23. Specifically, the control unit 25 is configured to perform control to acquire the inspection position 53 of the inspection target 40 based on the inspection image 61 and associate the acquired inspection position 53 with the three-dimensional model position 54. In this embodiment, the control unit 25 is configured to perform control to store the three-dimensional model position 54 corresponding to the inspection position 53 on the three-dimensional model 52, the inspection position 53, and the inspection result 50 in association with each other. In this embodiment, the control unit 25 is configured to perform control to store, in addition to the three-dimensional model position 54, the inspection position 53, and the inspection result 50, the inspection determination result 51 of the inspection target 40 in association therewith. The inspection determination result 51 is information indicating whether or not the inspection target 40 inspected by the inspection unit 10 is required to be repaired or replaced. The inspection determination result 51 is acquired based on the inspection result 50. The inspection determination result 51 includes, for example, "PASS" indicating that the inspection target 40 is not required to be repaired or replaced and "FAIL" indicating that the inspection target 40 is required to be repaired or replaced.

In this embodiment, the imaging unit 22 acquires the inspection image 61 by imaging the inspection target 40 in a state in which the inspector 30 causes the marker light (the first marker light or the second marker light) at the inspection target 40. The control unit 25 is configured to acquire the inspection determination result 51 based on the marker light reflected in the inspection image 61. In other words, the control unit 25 determines that the inspection target has passed the inspection when the first marker light is reflected in the inspection image 61. Further, the control unit 25 determines that the inspection target has failed the inspection when the second marker light is reflected in the inspection image 61.

Figure 8:
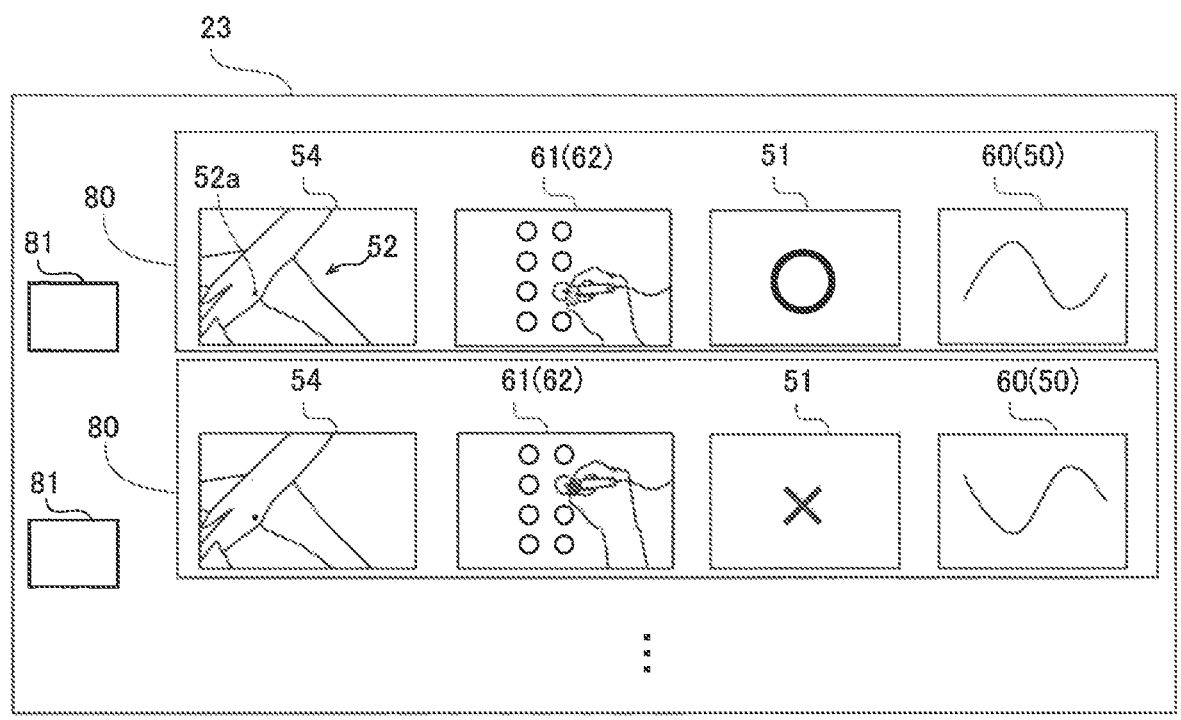
FIG. 8 is a diagram for explaining the processing of storing associated information.

As shown in FIG. 8, the control unit 25 is configured to store the three-dimensional model position 54, the inspection image 61, the inspection result 50, and the inspection determination result 51 as one data file 80 to thereby associate them with each other. For example, the data file 80 is configured to be editable as a database in the storage unit 23. The measurement information image 60 and the inspection image 61 (the image 62 reflected in the visual range) are stored in the storage unit 23 in an image format (moving image format or still image format) composed of digital signals, such as, e.g., a JPEG (Joint Photographic Experts Group) format, an MPEG (Moving Picture Experts Group) format, and an AVI (Audio Video Interleave) format.

In the example shown in FIG. 8, when the inspection determination result 51 is "PASS", the control unit 25 causes the image in which a mark indicating "PASS" is shown to be stored as the inspection determination result 51. In this embodiment, the control unit 25 causes the image in which "○" is shown as a mark indicating "PASS" to be stored as an inspection determination result 51. Further, when the inspection determination result 51 is "FAIL", the control unit 25 causes the image in which a mark indicating "FAIL" is shown to be stored as the inspection determination result 51. For example, as shown in FIG. 8, the control unit 25 causes the image in which "X" is shown as a mark indicating "FAIL" to be stored as an inspection determination result 51.

The control unit 25 is configured to acquire information 81 (see FIG. 1) on the aircraft inspection stored in advance in the server device 121. The control unit 25 is configured to store one data file 80 and the information 81 on the aircraft inspection in association with each other. For example, the information 81 on the aircraft inspection is composed of information on the target aircraft model number, the inspection date and time, the inspection operator, the inspection site, etc.

(Inspection Flow of Inspection Target)

Figure 9:
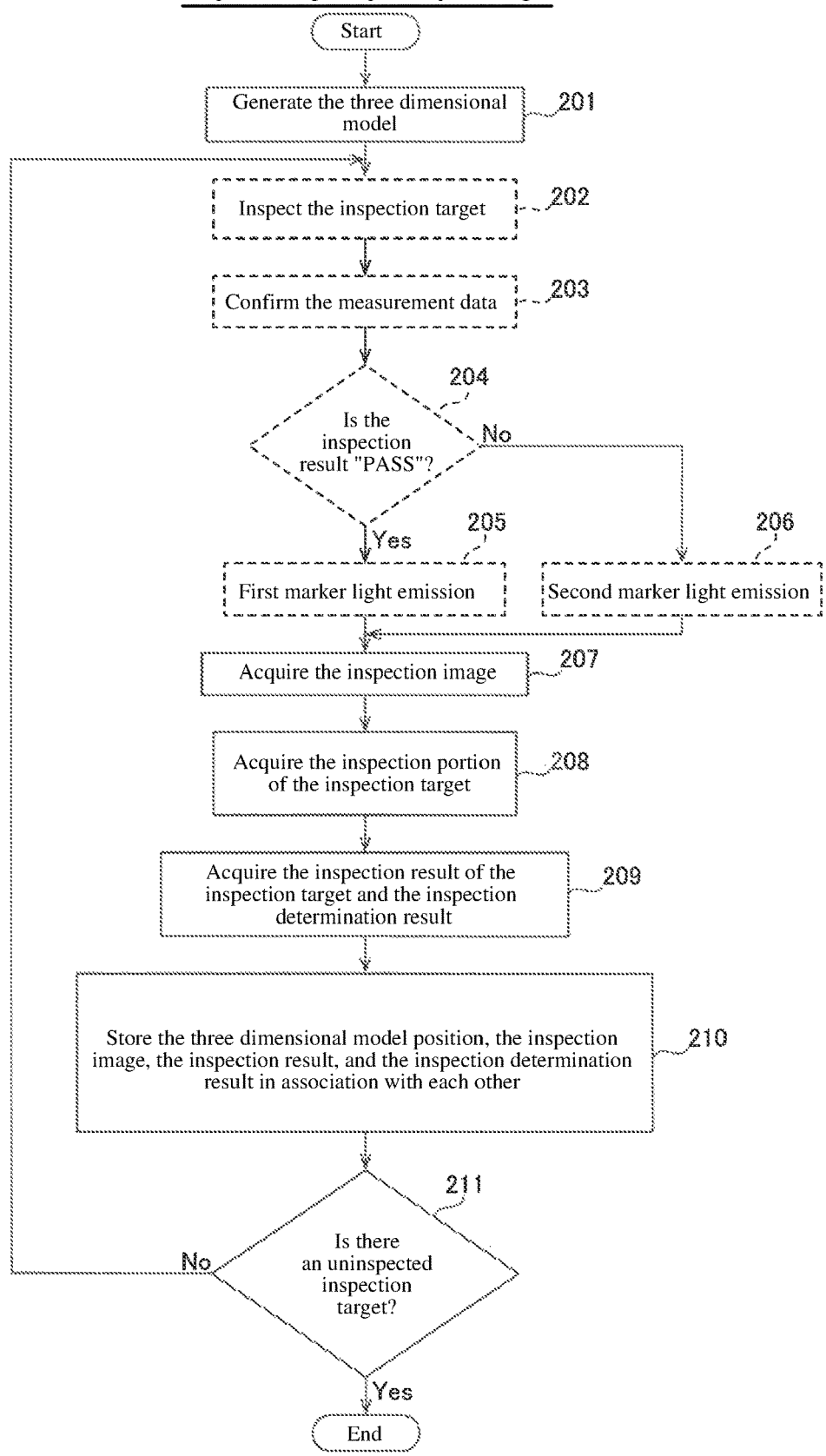
FIG. 9 is a flowchart for explaining the inspection target inspection processing according to one embodiment.

Next, referring to FIG. 9, the inspection processing of the inspection target 40 in this embodiment will be described. In FIG. 9, for convenience, Steps to be performed by the inspector 30 are also illustrated in the flowchart. Note that Steps to be performed by the inspector 30 are each illustrated by a broken line.

In Step 201, the three-dimensional model generation unit 25a generates the three-dimensional model 52 of the shape of the aircraft by acquiring the shape data from a plurality of positions. Note that the processing of Step 201 may be performed in advance prior to the start of the inspection.

Next, in Step 202, the inspector 30 inspects the inspection target 40, which is an aircraft component. Next, in Step 203, the inspector 30 confirms the inspection result 50.

Next, in Step 204, the inspector 30 determines whether or not the inspection result 50 is "PASS." When the inspection result 50 is "PASS," the processing proceeds to Step 205. When the inspection result 50 is "FAIL," the processing proceeds to Step 206.

When the processing has proceeded to Step 205, in Step 205, the inspector 30 causes the first marker light to emit at the inspection position 53 of the inspection target 40 using the marker light generation unit 13. When the processing has proceeded to Step 206, in Step 206, the inspector 30 causes the second marker light to emit at the inspection position 53 of the inspection target 40 using the marker light generation unit 13.

Next, in Step 207, the control unit 25 acquires the inspection image 61. Next, in Step 208, the inspection position acquisition unit 25b acquires the inspection position 53 at which the inspection target 40 is inspected. Next, in Step 209, the control unit 25 acquires the inspection result 50 and the inspection determination result 51.

Next, in Step 210, the three-dimensional model position 54 on the three-dimensional model 52 corresponding to the inspection position 53, the inspection position 53, the inspection result 50, and the inspection determination result 51 are stored in association with each other.

Next, in Step 211, it is determined whether or not there is an uninspected inspection target 40. Specifically, the control unit 25 determines whether or not there is an uninspected inspection target 40 based on an inspection plan or the like in which inspection targets 40 to be inspected are determined in advance. When there is an uninspected inspection target 40, the processing returns to Step 202. When there is no uninspected inspection target 40, the processing ends.

(Inspection Result Display)

Next, referring to FIG. 10, the configuration in which the aircraft inspection support device 100 in this embodiment displays the inspection position 53 on the inspection target 40 will be described.

The control unit 25 is configured to perform control to display past inspection results 57 at least at the time of the last inspection, on the image 62 reflected in the visual range, based on the image 62 reflected in the visual range and the three-dimensional model 52 in which the three-dimensional model position 54 and the inspection position 53 are associated with each other. The control unit 25 is configured to acquire, prior to the inspection, past inspection results 57 and store them in the storage unit 23 in advance.

Figure 10:
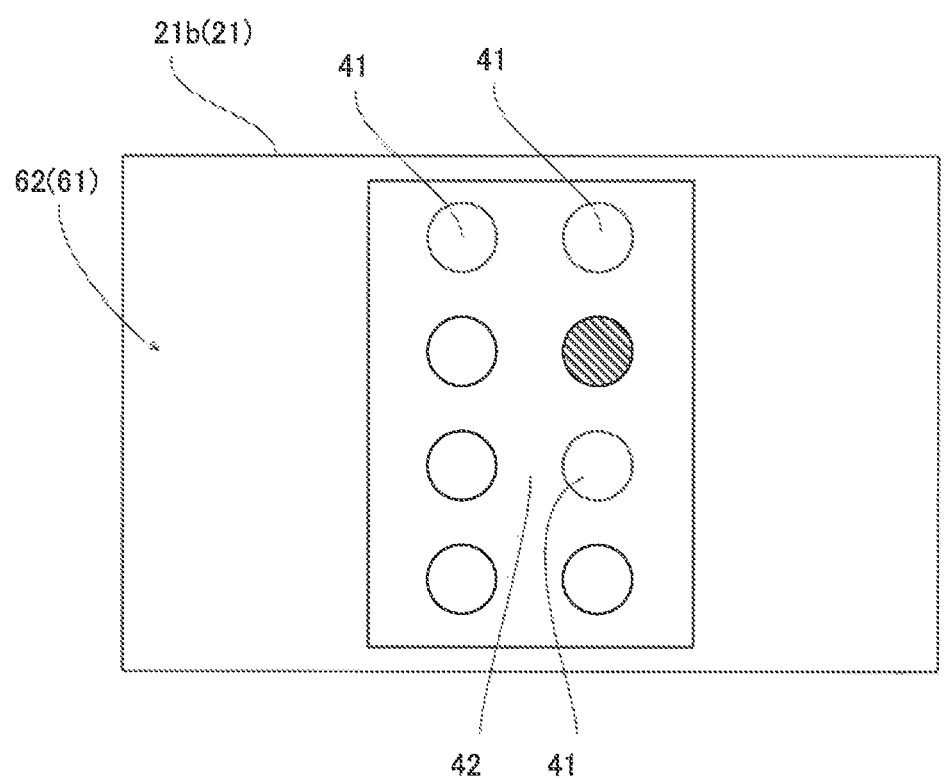
FIG. 10 is a schematic diagram for explaining an inspection result displayed on a display unit.

Specifically, as shown in FIG. 10, the control unit 25 is configured to perform control to display the image 62 reflected in the visual range on the display screen 21b of the HMD 21 and display the inspection result 50 at the inspection position 53 on the image 62 reflected in the visual range. In the example shown in FIG. 10, the inspection target 40 (rivet 41) in which the inspection result 50 (inspection determination result 51) is "FAIL" is shown by hatching. The inspection result 50 to be displayed at the inspection position 53 on the image 62 reflected in the visual range may be an inspection result 57 of the previous inspection (the last inspection) or any previous inspection result 57 (before the two previous inspections). The last inspection result 57 and the inspection result 57 before that may be displayed together.

(Inspection Result Display Flow)

Figure 11:
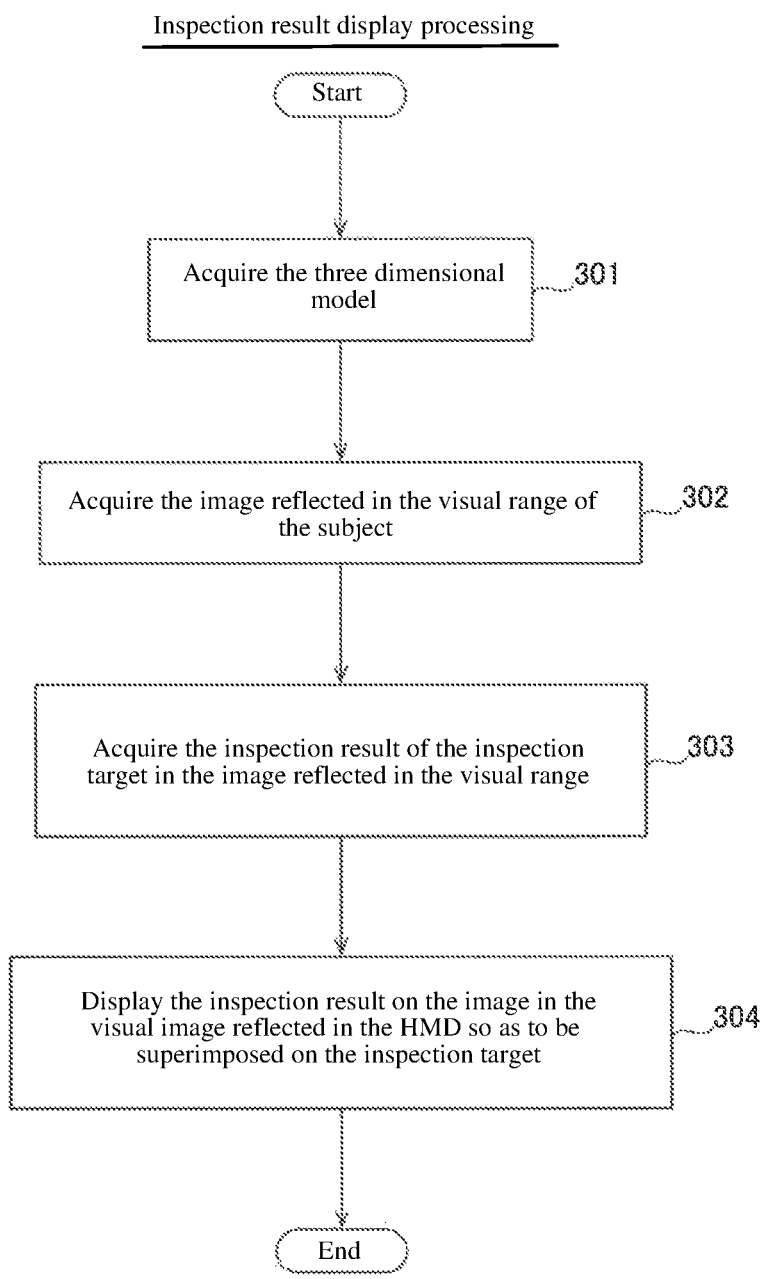
FIG. 11 is a flowchart for explaining the inspection result display processing.

Next, referring to FIG. 11, the processing of displaying the inspection result 50 will be described.

In Step 301, the control unit 25 acquires the three-dimensional model 52 in which the three-dimensional model position 54 and the inspection position 53 are associated to each other.

Next, in Step 302, the control unit 25 acquires the image 62 reflected in the visual range of the inspector 30.

Next, in Step 303, the control unit 25 acquires the inspection result 50 of the inspection target 40 in the image 62 reflected in the visual range. Specifically, the control unit 25 identifies the inspection target 40 in the three-dimensional model 52, based on the inspection position 53 of the inspection target 40 in the image 62 reflected in the visual range and acquires the inspection result 50 associated with the three-dimensional model 52.

Next, in Step 304, the control unit 25 displays the image 62 reflected in the visual range in the display screen 21b of the HMD 21 and displays the inspection result 50 at the inspection position 53 on the image 62 reflected in the visual field in a superimposed manner. Thereafter, the processing ends.

(Inspection of State Change in External Shape)

Next, referring to FIG. 12, the configuration in which the aircraft inspection support device 100 in this embodiment inspects the state change in the external shape will be described.

In this embodiment, the aircraft inspection support device 100 is configured to perform inspections of indentations, defects, corrosion, cracks (cracking or fissures), abrasion, etc., as changes in the external shape. FIG. 12 is a schematic diagram showing an example of inspecting dents 71 on the main wing unit as, for example, the state change in the external shape.

The external shape inspection unit 25d is configured to perform control to display the external shape inspection result 58 with respect to the inspection position 53 on the image 61 reflected in the visual range, based on the image 61 reflected in the visual range, the three-dimensional model 52 in which the three-dimensional model position 54 and the inspection position 53 are associated to each other, and the external shape inspection result 58 indicating the state change in the external shape at the inspection position 53.

Figure 12:
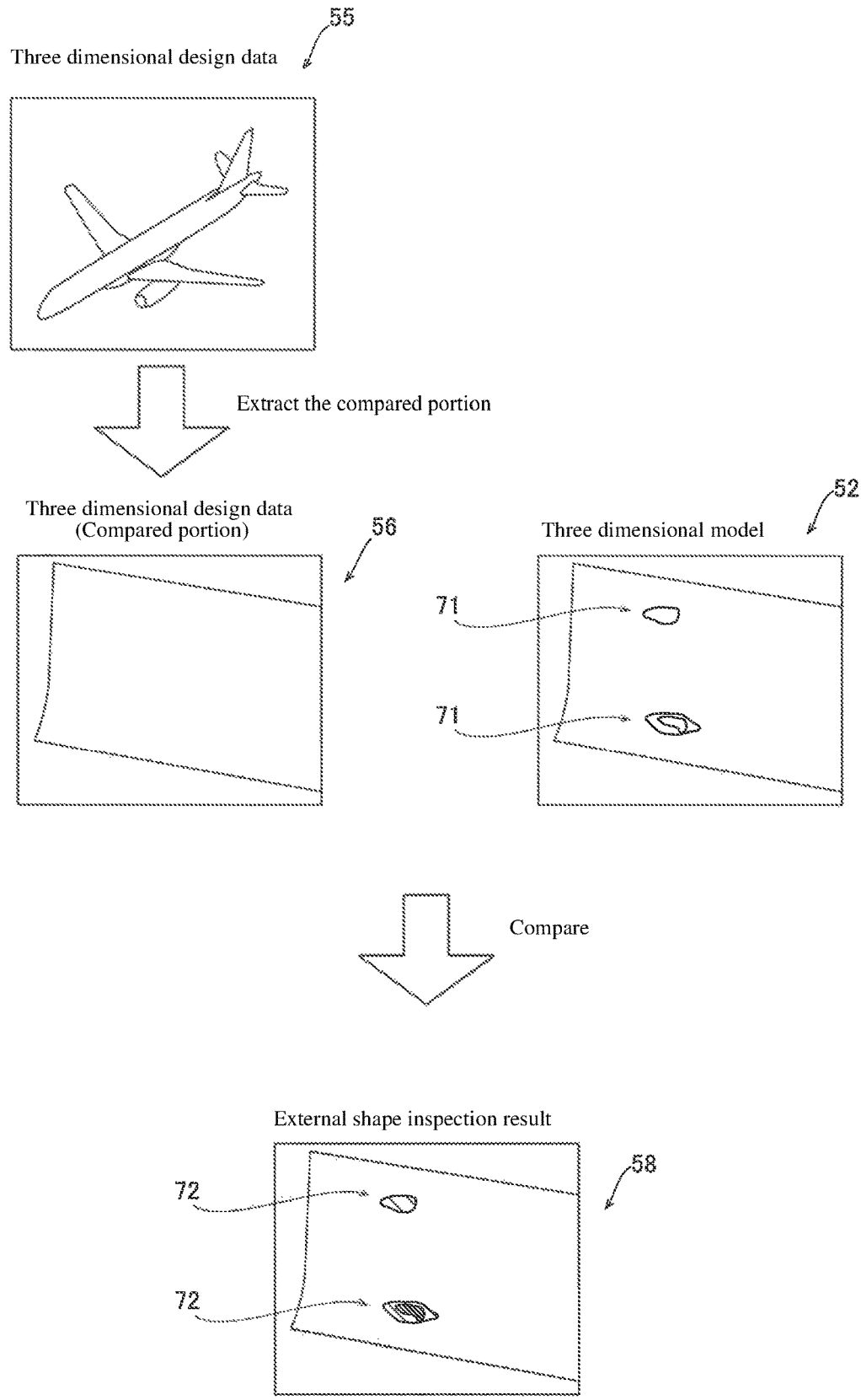
FIG. 12 is a schematic diagram for explaining an inspection of a state change in an external shape.

Specifically, as shown in FIG. 12, the external shape inspection unit 25d is configured to inspect the state change in the external shape in the inspection region including the inspection target 40, based on the comparison between the three-dimensional design data 56 generated by the three-dimensional model generation unit 25a and the three-dimensional data 56 acquired by the design data acquisition unit 25c. Specifically, the external shape inspection unit 25d extracts the three-dimensional design data 56 corresponding to the inspection region including the inspection target 40 to be inspected in the external shape from the three-dimensional design data 56. The control unit 25 is configured to inspect the state change in the external shape by acquiring the shape change in the three-dimensional model 52 with respect to the extracted three-dimensional design data 56. The control unit 25 acquires the external shape inspection result 58 as the inspection result of the state change in the external shape. In the example shown in FIG. 12, the control unit 25 indicates the shape and the size of the dent 71 depending on the shape and the size of the hatched region 72 in the external shape inspection result 58. Further, in the example shown in FIG. 12, the depth of the dent 71 is shown by the difference in the hatching. That is, the deeper the hatching becomes, the deeper the dent 71 becomes.

(Inspection Flow of State Change in External Shape)

Figure 13:
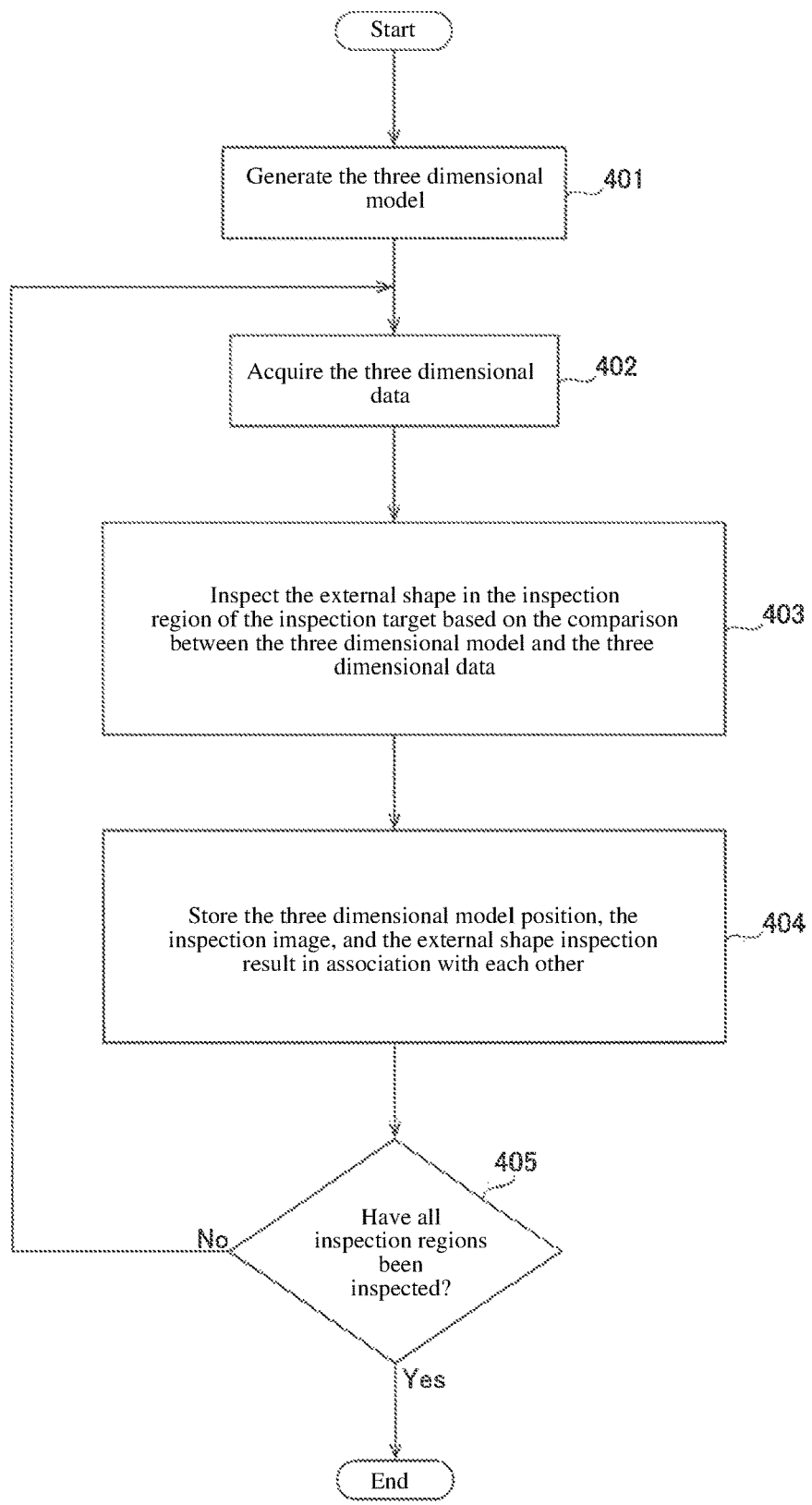
FIG. 13 is a flowchart for explaining the inspection processing of the state change in the external shape.

Next, referring to FIG. 13, the processing of inspecting the state change in the external shape will be described.

In Step 401, the control unit 25 acquires the three-dimensional model 52. Next, in Step 402, the control unit 25 acquires the three-dimensional design data 56.

Next, in Step 403, the external shape inspection unit 25d inspects the external shape in the inspection region of the inspection target 40, based on the comparison between the three-dimensional model 52 and the extracted three-dimensional design data 56.

Next, in Step 404, the control unit 25 stores the three-dimensional model position 54, the inspection image 61, and the external shape inspection result 58 in association with each other. The external shape inspection result 58 includes the size (vertical and horizontal dimensions) and the depth of the portion where the external shape has changed. Note that the control unit 25 is configured to acquire the size (vertical and horizontal dimensions) and the depth of the portion where the change in the external shape has occurred, based on the shape change of the three-dimensional model 52 with respect to the three-dimensional design data 56.

Next, in Step 405, the control unit 25 determines whether or not all of the inspection regions have been inspected. When the inspections of all of the inspection regions have been completed, the processing ends. When not all of the inspection regions has been completed, the processing returns to Step 402.

Effects of this Embodiment

In this embodiment, the following effects can be obtained.

In this embodiment, by configuring as described above, even in a case where inspection targets 40 have not been stored in the three-dimensional design data 56 of the aircraft, the inspection position 53 of the inspection target 40 and the inspection result 50 can be stored in association with each other. Since the control unit 25 is provided, the three-dimensional model position 54 on the three-dimensional model 52 corresponding to the generated inspection position 53, the inspection position 53, and the inspection result 50 can be stored in association with each other. As a result, even in a case where inspection targets 40 have not been stored in the three-dimensional design data 56 of the aircraft, the inspection position 53 and the inspection result 50 can be stored in association with each other. Since the control unit 25 is provided, the inspector 30 can confirm the inspection position 53 on the three-dimensional model 52, which enables to grasp the inspection position 53 three-dimensionally. As a result, the inspection position 53 in the aircraft can be grasped more intuitively as compared with the case in which the inspection position 53 is confirmed in the two-dimensional model. Further, since the control unit 25 is provided, the inspection position 53 and the inspection result 50 can be stored in association with each other. Therefore, by accumulating data, it becomes possible to compare with the previous data, which enables to grasp the change in the inspection result 50 over time. As a result, by analyzing together with the operational data, such as, the flight time and the flight cycle, it is possible to acquire the information that is useful for intensive inspection points and preventive maintenance.

As described above, in this embodiment, the storage unit 23 is further provided. The storage unit 23 is configured to store the three-dimensional model 52, the inspection position 53, and the inspection result 50. The control unit 25 is configured to perform control to associate the inspection position 53 of the inspection target 40 and the three-dimensional model position 54 and store the three-dimensional model 52 in which the three-dimensional model position 54 and the inspection position 53 are associated with each other in the storage unit 23. This makes it possible to store the three-dimensional model 52 in which the three-dimensional model position 54 and the inspection position 53 are associated with each other without providing the communication unit 24 or the like, unlike the configuration that the three-dimensional model 52 in which the three-dimensional model position 54 and the inspection position 53 are associated to each other is stored in the storage unit provided at a location, such as, a control room 120, different from the aircraft inspection support device 100. As a result, it is possible to suppress the number of components from being increased.

Further, in this embodiment, as described above, the imaging unit 22 is further provided. The imaging unit 22 is configured to acquire the inspection image 61 captured by imaging the region including the inspection target 40 at the time of inspection. The control unit 25 is configured to perform control to acquire the inspection position 53 of the inspection target 40 based on the inspection image 61 and associate the acquired inspection position 53 with the three-dimensional model position 54. With this, since the inspection position 53 is acquired based on the inspection image 61, the inspection positions 53 of the plurality of inspection targets 40 can be acquired from one inspection image 61 by imaging the plurality of inspection targets 40. As a result, for example, the inspection position 53 can be efficiently acquired as compared with the configuration in which the inspector 30 inputs the position coordinate of the inspection position 53 of the inspection target 40 one by one.

Further, in this embodiment, as described above, the control unit 25 is configured to perform control to store the inspection determination result 51 of the inspection target 40 in association with the three-dimensional model position 54, the inspection position 53, and the inspection result 50. With this, not only the inspection result 50 but also the inspection determination result 51 can be confirmed. As a result, by confirming the inspection determination result 51, it is possible to easily determine whether the inspection result is "PASS" or "FAIL" at a glance.

Further, in this embodiment, as described above, the marker light generation unit 13 is further provided. The marker light generation unit 13 is configured to irradiate or emit marker light indicating the inspection position 53 when capturing the inspection image 61. With this, the inspection result 50 can be easily grasped on the inspection image 61 by confirming the marker light reflected in the inspection image 61. As a result, the inspection result 50 can be grasped at a glance, which can improve the user's convenience.

Further, in this embodiment, as described above, the marker light generation unit 13 is configured to irradiate or emit at least first marker light indicating that the inspection result is "PASS" and second marker light indicating that the inspection result is "FAIL" with respect to the inspection position 53 of the inspection target 40. As a result, it is possible to more easily grasp the inspection result 50 by confirming whether or not the first marker light is irradiated or emitted or the second marker light is irradiated or emitted with respect to the inspection target 40. As a result, it becomes easy to grasp whether the inspection result 50 is "PASS" or "FAIL" at first glance, which can further improve the user's convenience.

Further, in this embodiment, as described above, the three-dimensional model generation unit 25a is configured to generate the three-dimensional model 52, based on the plurality of images 63 captured while changing the imaging position. With this, by capturing images at a plurality of imaging positions, it is possible to easily acquire the three-dimensional model 52. Consequently, it is possible to suppress the equipment configuration from becoming complicated as compared with, for example, the configuration of acquiring a three-dimensional model 52 by 3D laser scanning or the like.

Further, in this embodiment, as described above, the external shape inspection unit 25d is further provided. The external shape inspection unit 25d is configured to perform the inspection of the state change in the external shape of the inspection target 40, based on at least the three-dimensional model 52. With this, even in a case where the three-dimensional design data 56 cannot be acquired, the state change in the external shape can be inspected by acquiring the three-dimensional model 52.

Further, in this embodiment, as described above, the design data acquisition unit 25c is further provided. The design data acquisition unit 25c is configured to acquire the three-dimensional design data 56 in the inspection region including at least the inspection target 40. The external shape inspection unit 25d is configured to perform an inspection of the state change in the external shape in the inspection region including the inspection target 40, based on the comparison between the three-dimensional model 52 generated by the three-dimensional model generation unit 25a and the three-dimensional design data 56 acquired by the design data acquisition unit 25c. With this, the external shape is inspected by comparing the three-dimensional design data 56 with the three-dimensional model 52. Therefore, it is possible to inspect the minute changes of the external shape as compared with the case in which the state change in the external shape is inspected only by the three-dimensional model 52. As a result, the inspection accuracy of the state change in the external shape can be improved.

Further, in this embodiment, as described above, the HMD 21 is further provided. The HMD 21 serves as a display unit for displaying the image 62 reflected in the visual range of the inspector 30. The control unit 25 is configured to perform control to display the past inspection result 57 at least in the last inspection of the inspection target 40 on the image 62 reflected in the visual range, based on the image 62 reflected in the visual range and the three-dimensional model 52 in which the three-dimensional model position 54 and the inspection position 53 are associated with each other. With this, both the inspection target 40 and the past inspection result 57 can be visually recognized at a glance by confirming the image 62 reflected in the visual range. As a result, the inspection target 40 to be carefully inspected can be easily determined at a glance, based on the past inspection result 57.

Further, in this embodiment, as described above, the control unit 25 is configured to perform control to display the external shape inspection result 58 with respect to the inspection position 53 on the image 62 reflected in the visual range, based on the images 62 reflected in the visual range, the three-dimensional model 52 in which the three-dimensional model position 54 and the inspection position 53 are associated with each other, and the external shape inspection result 58 indicating the change in the appearance in the inspection position 53. As a result, the external shape inspection result 58 is displayed with respect to the inspection target 40. Thus, for example, the inspection target 40 that requires a reinspection or the inspection target 40 that requires repairs can be easily identified. Accordingly, an inspection target 40 that requires a reinspection or repairs and an inspection target 40 that does not require a reinspection or repairs can be easily identified at a glance. As a result, the work efficiency of the reinspection or the repair can be improved.

Further, in this embodiment, as described above, the HMD 21 is configured as a display unit for displaying the inspection region including the inspection target 40 and the inspection position 53 in the inspection target 40. With this, the inspector 30 can visually recognize both the image displaying the inspection target 40 and the inspection result 50 without greatly changing the line of sight. Therefore, it is possible to further improve the inspection workability by the inspector 30.

Further, in this embodiment, as described above, the imaging unit 22 is configured to acquire the inspection image 61, the plurality of images 63 for generating the three-dimensional model 52, and the image 62 reflected in the visual range of the inspector 30. With this, the inspection image 61, the plurality of images 63 for generating the three-dimensional model 52, and the image 62 reflected in the visual range of inspector 30 can be acquired by a single imaging unit 22. As a result, as compared with the configuration provided with an imaging unit for acquiring the respective images, it is possible to suppress the device configuration from becoming complicated and suppress the increase in the number of components.

Modified Embodiment

It should be understood that the embodiments disclosed here are examples in all respects and are not restrictive. The scope of the present invention is shown by the claims rather than the descriptions of the embodiments described above, and includes all changes (modifications) within the meaning of equivalent and the scope of claims.
(First Modification)

Figure 14:
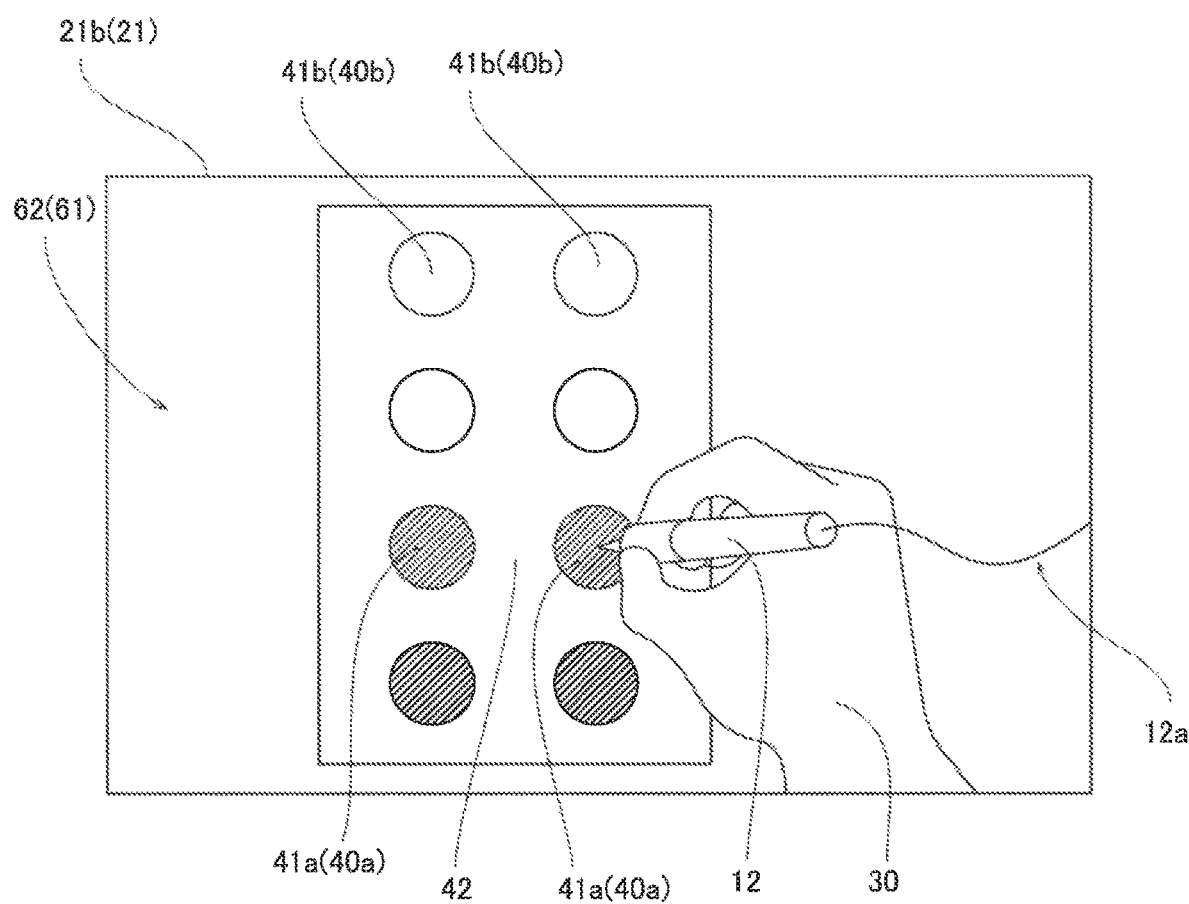
FIG. 14 is a schematic diagram for explaining the inspected inspection target displayed on the display unit according to a first modification.

For example, in the above-described embodiments, an example has been described in which it is configured such that the inspection result 50 is displayed with respect to the inspection target 40 in the display screen 21b of the HMD 21, but the present invention is not limited thereto. For example, as shown in FIG. 14, the control unit 25 is configured to perform control to identifiably display the uninspected inspection target 40a (rivet 41a) and the inspected inspection target 40b (rivet 41b) by displaying the inspection position 53 on the image 62 reflected in the visual range, based on the image 62 reflected in the visual range and the three-dimensional model 52 in which the three-dimensional model position 54 and the inspection position 53 are associated with each other. Note that in the example shown in FIG. 14, the inspected inspection target 40b (rivet 41b) and the uninspected inspection target 40a (rivet 41a) are shown distinguishably by hatching the uninspected inspection target 40a (rivet 41a).

Figure 15:
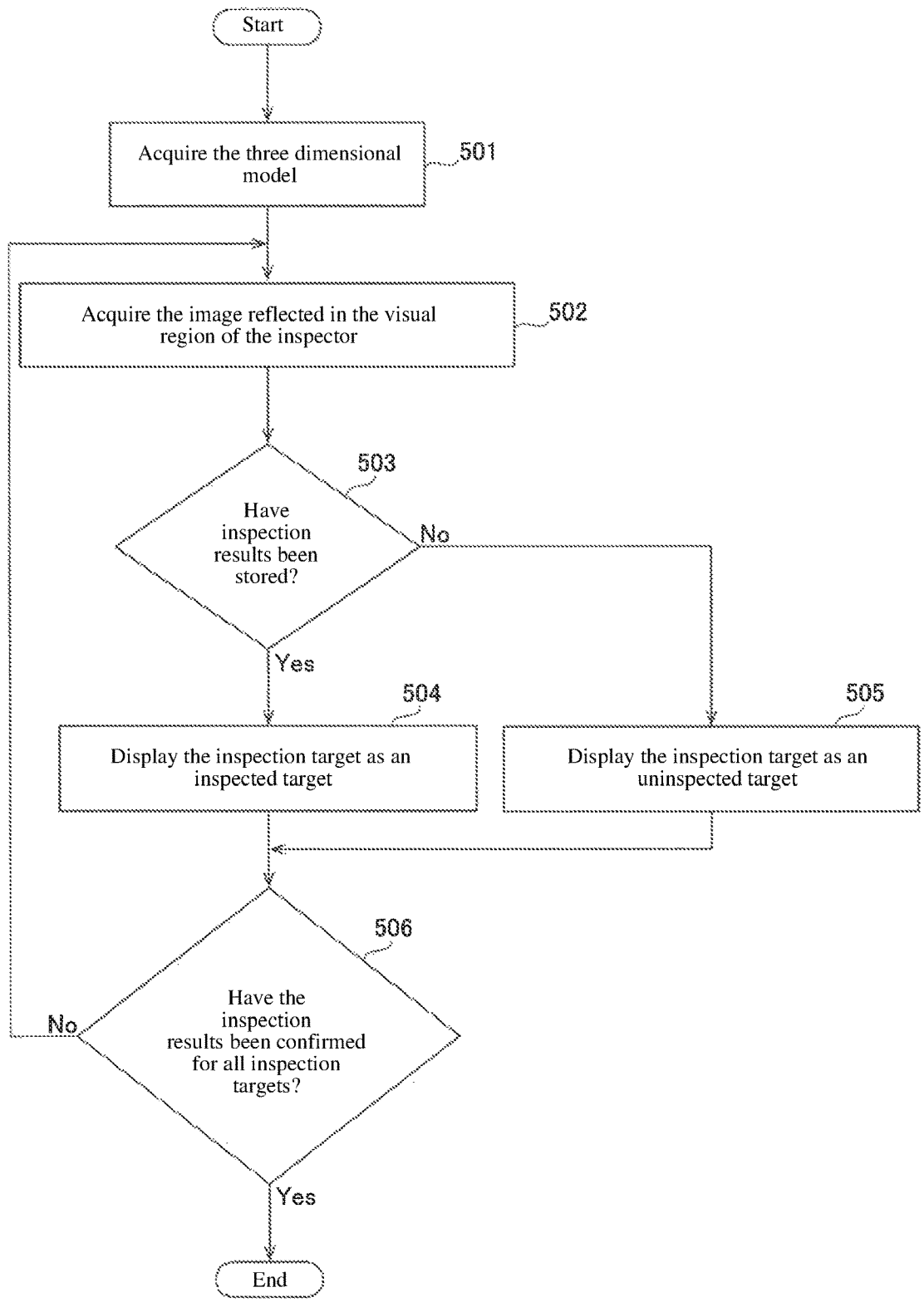
FIG. 15 is a flowchart for explaining the display processing of the inspected inspection target displayed on the display unit according to the first modification.

Referring to FIG. 15, the processing of displaying the inspected inspection target will be described.

In Step 501, the control unit 25 acquires the three-dimensional model 52. Next, in Step 502, the control unit 25 acquires an image 62 reflected in the visual range of the inspector 30.

Next, in Step 503, the control unit 25 determines whether or not the inspection results 50 have been stored regarding the inspection target 40 in the image 62 reflected in the visual range. In a case where the inspection results 50 have been stored, the processing proceeds to Step 504. In a case where the inspection results 50 have not been stored, the processing proceeds to Step 505.

In Step 504, the control unit 25 causes the inspection target 40 to be displayed as an inspected inspection target. In Step 505, the control unit 25 causes the inspection target 40 to be displayed as an uninspected inspection target.

Next, in Step 506, the control unit 25 determines whether or not the inspection result 50 has been stored for all of the inspection targets 40 in the image 62 reflected in the visual range. When all of the inspection targets 40 have been inspected, the processing ends. When the inspection has not been completed for all of the inspection targets 40, the processing returns to Step 502.

By configuring as described above, even in the case of inspecting an aircraft or the like having a large number of components, it is possible to suppress the occurrence of inspection omission. Further, it is possible to suppress the reinspection of the inspected inspection target 40. As a result, it is possible to suppress omission of the inspection and duplication of the inspection, which can improve the inspection efficiency.

(Second Modification)

Figure 16:
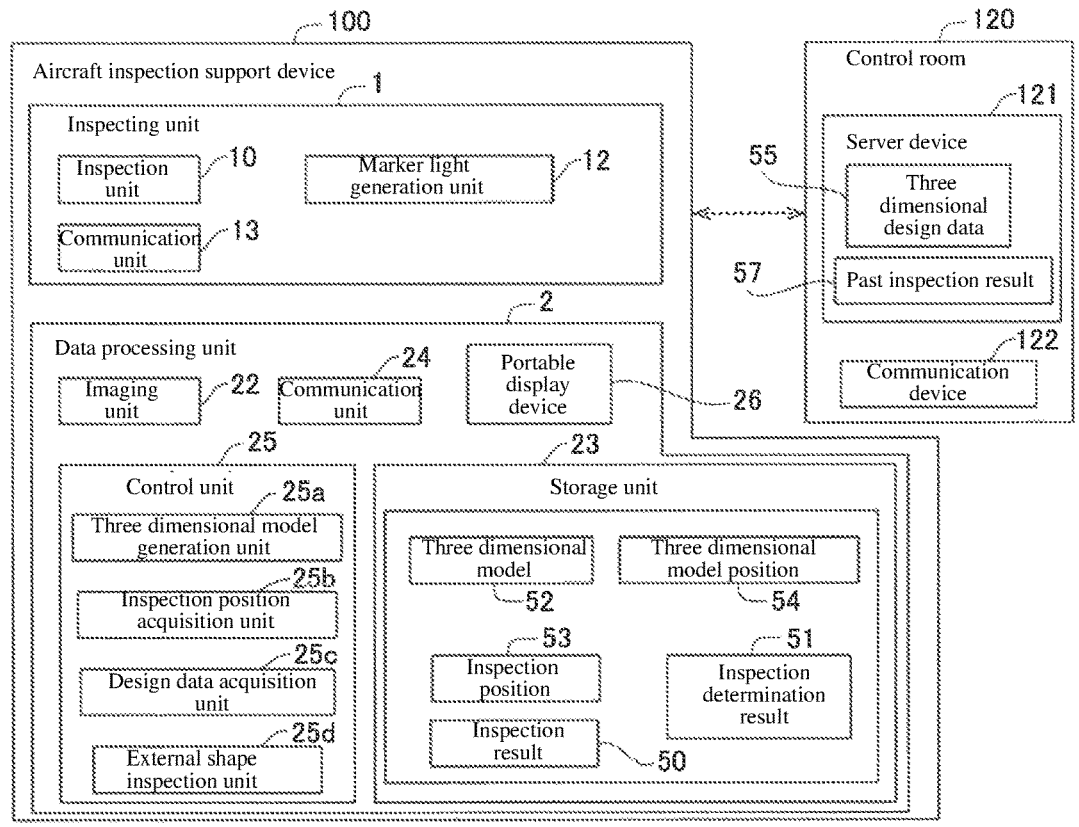
FIG. 16 is a block diagram showing a configuration of an aircraft inspection support device according to a second modification.
Figure 17:
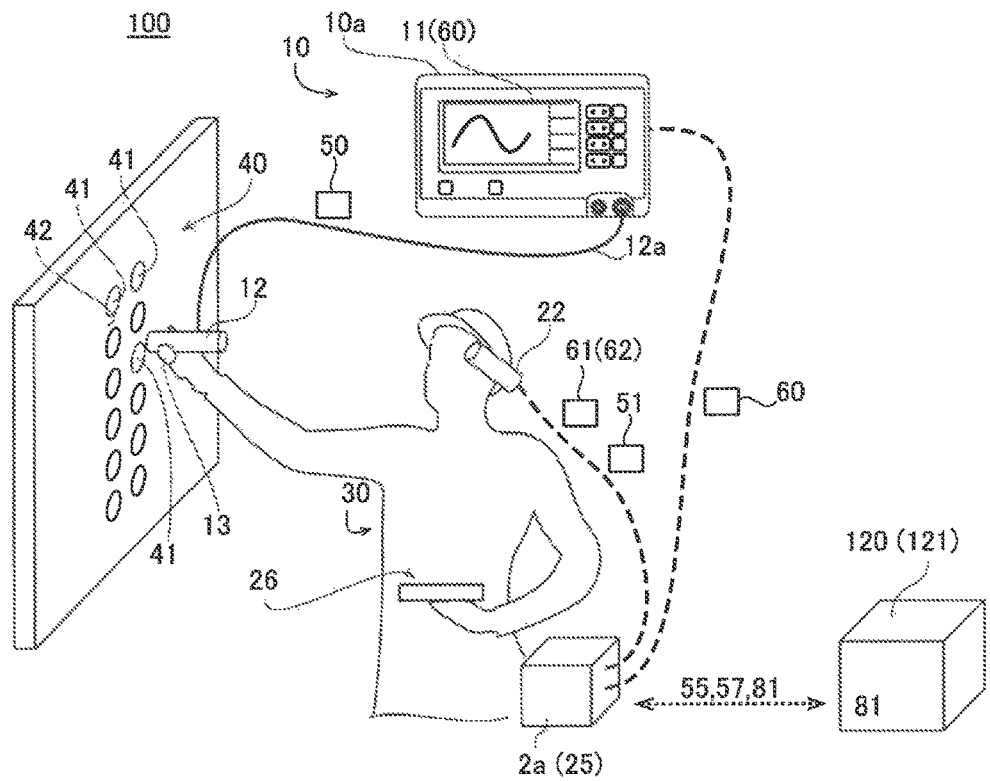
FIG. 17 is a schematic diagram showing the configuration of the aircraft inspection support device according to the second modification.

Further, in the above-described embodiment, an example has been described in which the display unit is configured by the HMD 21, but the present invention is not limited thereto. For example, as shown in FIG. 16, the display unit may be a portable display device 26 that identifiably displays the inspection position 53 on the inspection target 40 on the image 62 reflected in the visual range. The portable display device 26 includes, for example, a tablet terminal or the like. In a case where the display unit is configured as a portable display device 26, as shown in FIG. 17, the inspector 30 may perform the inspection with the portable display device 26 held by hand.

Figure 18:
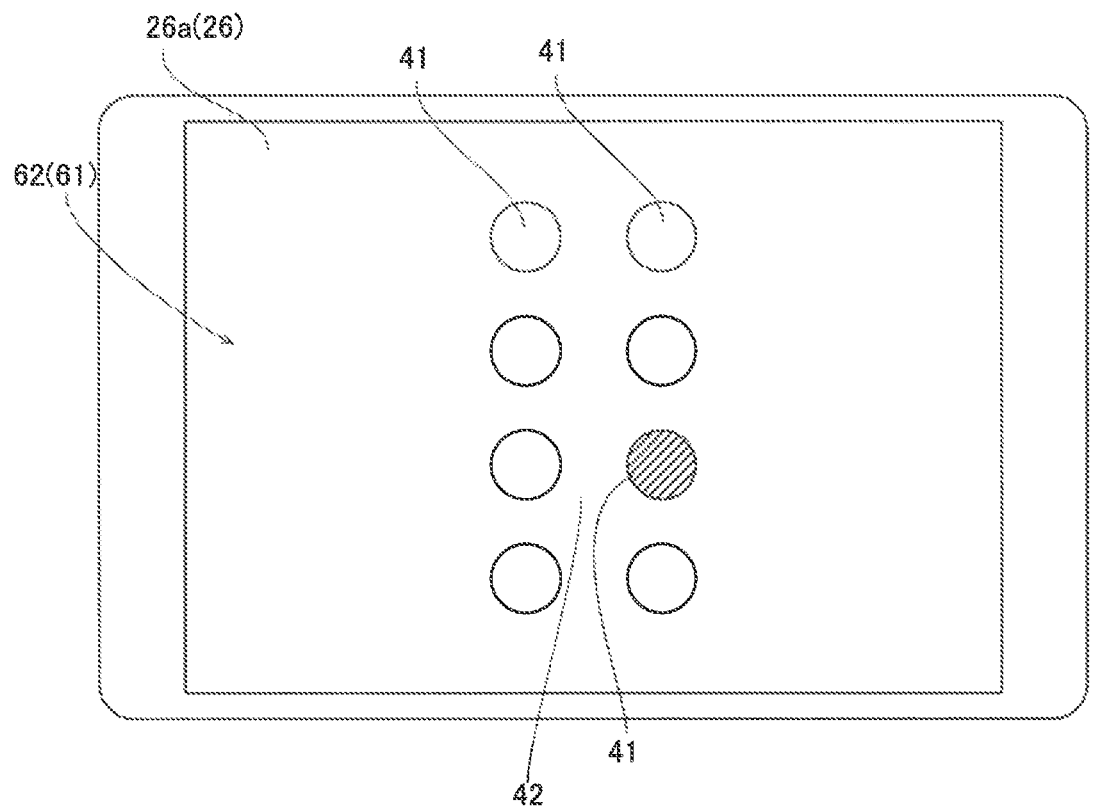
FIG. 18 is a schematic diagram showing a configuration of a display unit according to the second modification.

When performing the inspection with the portable display device 26 held by hand, for example, as shown in FIG. 18, it may be configured such that the image 62 reflected in the visual range and captured by the imaging unit 22 is displayed on the display screen 26a of the display device 26 and that the inspection position 53 or the inspection result 50 are displayed so as to be superimposed on the image 62 reflected in the visual range. With this configuration, since the display unit is configured as a portable display device 26, it is possible to arrange the portable display device 26 at any position. For example, the inspector 30 performs the inspection with the portable display device 26 held by hand. As a result, the portable display device 26 can be arranged at any position where the inspector 30 can easily recognize, which can improve the user's convenience.

(Third Modification)

Figure 19:
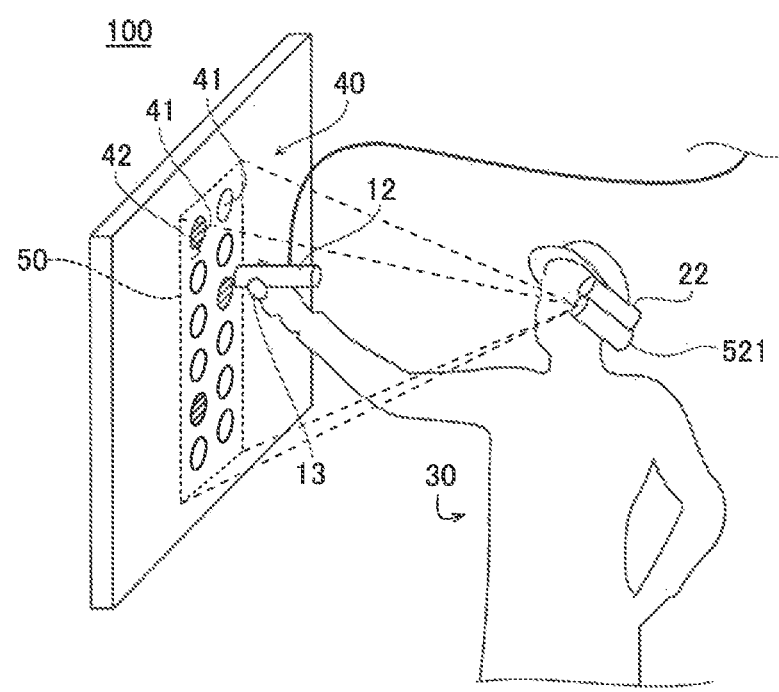
FIG. 19 is a schematic diagram showing a configuration of the aircraft inspection support device according to a third modification.

Further, in the above-described embodiment, an example has been described in which the inspection position 53 is displayed on the image 62 reflected in the visual range of the inspector 30 reflected on the HMD 21 in a superimposed manner, but the present invention is not limited thereto. For example, as in the projector 521 of the aircraft inspection support device 100 according to the third modification shown in FIG. 19, the inspection position 53 may be displayed by irradiating the inspection target 40 (the fuselage of the aircraft) with light. Note that in the embodiment shown in FIG. 19, the inspection target 40 in which the state has been changed is displayed so as to be identifiable by hatching.

(Fourth Modification)

Figure 20:
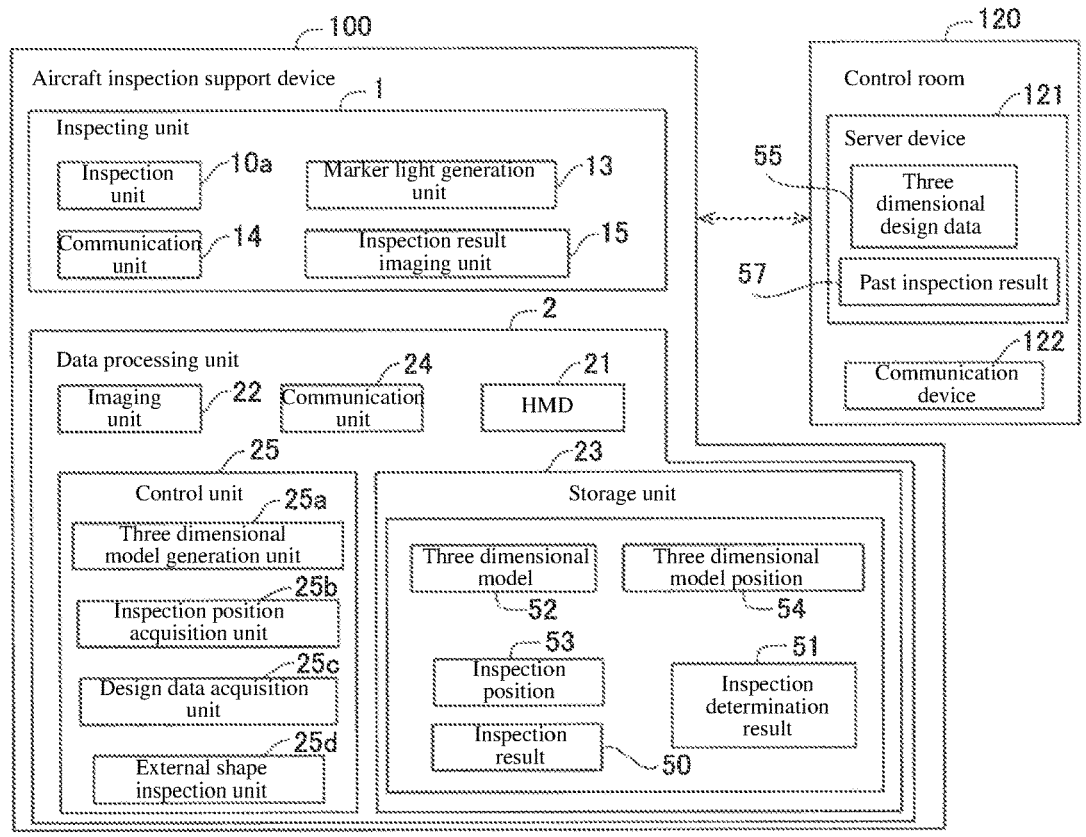
FIG. 20 is a block diagram showing a configuration of an aircraft inspection support device according to a fourth modification.

Further, in the above-described embodiment, an example has been described in which the inspection unit 10 outputs the inspection result 50 of a digital signal, but the present invention is not limited thereto. For example, as shown in FIG. 20, an inspection unit 10 configured to output the inspection result 50 of an analog signal may be used. The inspection unit 10 is a specific measurement instrument associated with the aircraft model or the inspection target 40 (e.g., the portion of the aircraft or the maintenance item). Therefore, the inspection unit 10 may not have the function of storing the inspection result 50 (analog signal) and may not have the function of performing data communication. That is, the inspection unit 10 may be configured as an analog device not using a digital signal. In a case where the inspection unit 10 is configured as an analog device, the control unit 25 cannot handle the inspection result 50 (analog signal). For this reason, as shown in FIG. 20, it is sufficient to provide an inspection result imaging unit 15 for capturing an image of the measurement information image 60 to capture the measurement information image 60 of the inspection unit side display unit 11. The control unit 25 may be configured to cause the measurement information image 60 as the inspection result 50 by the inspection unit 10 to be stored in association with the three-dimensional model position 54, the inspection position 53, and the inspection result 50. The inspection result imaging unit 15 is configured by the combination of, for example, a camera or a photodetector and optical components (mirrors, lenses, and filters). The inspection result imaging unit 15 is configured to be capable of capturing a still image or a moving image.

Further, even in a case where the inspection unit 10 has a function of storing a digital signal as an inspection result 50, in some cases, the inspection result 50 acquired by the inspection unit 10 is not compatible with the data that can be handled by the control unit 25. Even in such cases, by configuring as described in the fourth modification, the control unit 25 can store the measurement information image 60 in association with the three-dimensional model position 54 and the inspection position 53, as the inspection result 50 by the inspection unit 10.

(Fifth Modification)

Figure 21:
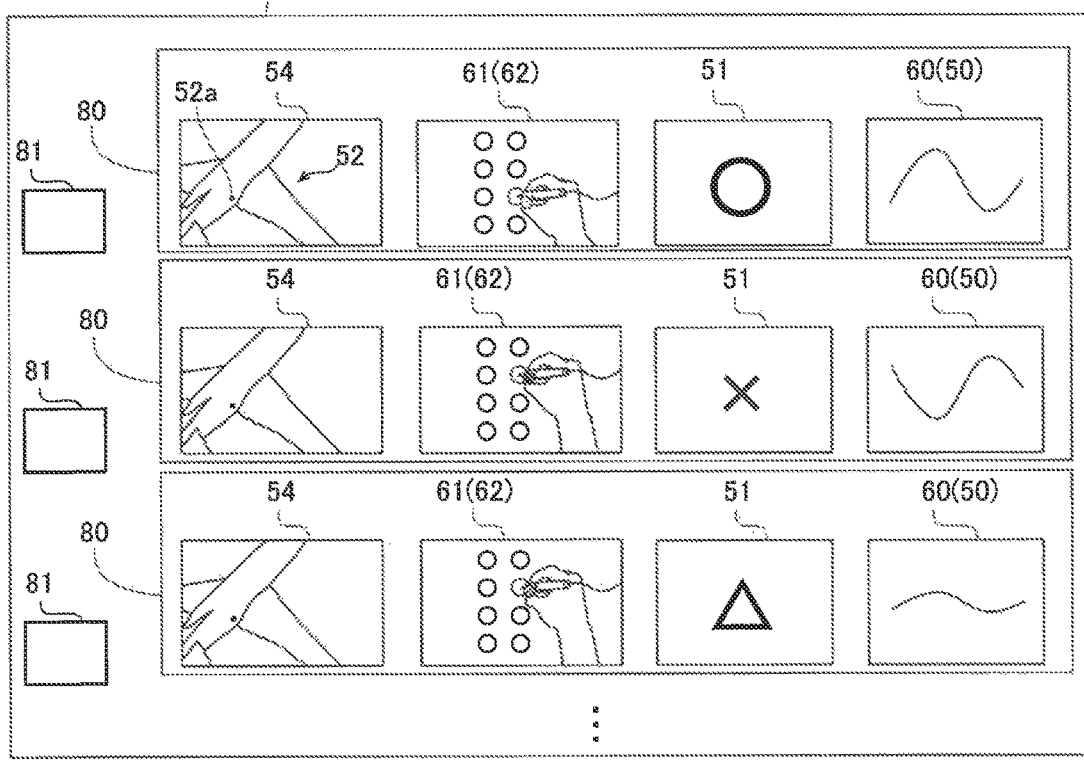
FIG. 21 is a diagram for explaining the processing of storing associated information according to a fifth modification.

Further, in the above-described embodiment, an example has been described in which whether the inspection result is "PASS" or "FAIL" is acquired as the inspection result 50 and is associated with the three-dimensional model 52, but the present invention is not limited thereto. For example, as shown in FIG. 21, the control unit 25 may be configured to determine that the inspection result is "CAUTION" in addition to "PASS" and "FAIL," based on the inspection result 50. In the case of providing the determination item of "CAUTION," the marker light generation unit 13 may be configured to be capable of emitting third marker light indicating the caution in addition to the first marker light and the second marker light. The control unit 25 may be configured to store, in addition to "PASS" and "FAIL," the inspection image 61 in the inspection target 40 which is "CAUTION", the three-dimensional model position 54, the inspection result 50, and the inspection determination result 51 in association with each other. In the example shown in FIG. 21, the inspection determination result 51 of "CAUTION" is illustrated as an image in which a triangle mark is depicted. Further, the third marker light is shown with hatching different from that of the first marker light and the second marker light. Further, the control unit 25 may be configured to determine "FOLLOW-UP REQUIRED" and "REINSPECTION (including a detailed inspection)" in addition to "PASS," "FAIL," and "CAUTION," based on the inspection result 50.

(Sixth Modification)

In the above-described embodiment, an example has been described in which the design data acquisition unit 25c acquires the three-dimensional design data 56 stored in the server device 121 in advance, but the present invention is not limited thereto. For example, it may be configured such that the design data acquisition unit 25c acquires the three-dimensional model 52 generated at the time of producing the aircraft or prior to inspection, as the three-dimensional design data 56. With this configuration, even in a case where the three-dimensional design data 56 cannot be acquired or even in a case where the inspection targets 40 have not been stored in the three-dimensional design data 56, the state change in the external shape can be inspected. Note that in a case where the design data acquisition unit 25c acquires the three-dimensional model 52 generated at the time of producing the aircraft or prior to inspection, as the three-dimensional design data 56, the processing of Step 201 in the inspection flow of the inspection target 40 of the above-described embodiment can be omitted.

(Other Modifications)

Further, in the above-described embodiment, an example has been described in which the aircraft inspection support device 100 is provided with the storage unit 23 and the communication unit 24, but the present invention is not limited thereto. For example, the aircraft inspection support device 100 may be configured to transmit the acquired three-dimensional model 52 or the like to the server device 121 by the communication unit 24 without providing the storage unit 23. Alternatively, it may be configured such that the storage unit 23 is detachably attached without providing the communication unit 24 and that the storage unit 23 detached from the aircraft inspection support device 100 is connected to the server device 121 to transfer the three-dimensional model 52 and the like to the server device 121.

Further, in the above-described embodiment, an example has been described in which the fuselage (the rivet 41 and the plate 42) of the aircraft is inspected as the component of the aircraft, but the present invention is not limited thereto. For example, a device, such as, e.g., a turbine inside an engine as a component of the aircraft, may be inspected. The present invention may also be applied to as an inspection device other than an eddy current crack detection device or an ultrasonic crack detection device for performing an inspection by a borescope when observing the state after the occurrence of bird strikes, or for performing a test or an inspection using other measuring instruments.

Further, in the above-described embodiment, an example has been described in which the aircraft inspection support device 100 is provided with the communication unit 24 to enable radio communication, but the present invention is not limited thereto. That is, the configuration for the radio communication described in the above-described embodiment may be configured as a configuration for wired communication using a cable.

Further, in the above-described embodiment, an example has been described in which the inspector 30 determines whether the inspection result is "PASS" or "FAIL" based on the inspection result 50, but the present invention is not limited thereto. For example, the control unit 25 may be configured to acquire the inspection result 50 based on the inspection result 50. More specifically, determination data acquired by measuring an inspection target 40 with a scratch or the like and an inspection target 40 with no scratch or the like may be stored in the storage unit 23 in advance. The control unit 25 may be configured to acquire the inspection result 50, based on the inspection result 50 of the inspection target 40 and the determination data.

Further, the above-described embodiments and modifications may be combined as appropriate. For example, in the above-described embodiments, it may be configured such that the uninspected inspection target 40 and the inspected inspection target 40 are displayed so as to be distinguishable at the time of performing the inspection.

In the above-described embodiment, an example has been described in which the control unit 25 performs control to store the inspection result 50 by the inspection unit 10 in association with the three-dimensional model position 54, the inspection position 53, and the inspection result 50, but the present invention is not limited thereto. As long as the control unit 25 causes the three-dimensional model position 54, the inspection position 53, and the inspection result 50 to be stored in association with each other, the inspection result 50 may not be stored in an associated manner.

Further, in the above-described embodiment, an example has been described in which the inspector 30 operates the marker light generation unit 13 to emit the first marker light or the second marker light, but the present invention is not limited thereto. For example, it may be configured such that the control unit 25 controls the marker light generation unit 13 to emit the first marker light or the second marker light based on the inspection result 50.

Further, in the above-described embodiment, an example has been described in which the three-dimensional model generation unit 25a generates the three-dimensional model 52 based on a plurality of images 63, but the present invention is not limited thereto. For example, it may be configured such that the three-dimensional model generation unit 25a generates the three-dimensional model 52 by any one of a Lidar SLAM (Light Detection and Ranging SLAM) for acquiring the positional relation of the inspection target 40 by emitting a laser beam, three-dimensional laser scanning, GPS (Global Positioning System), ultrasonic waves, a gyroscopic sensor, and an acceleration sensor, or the combination thereof. Further, in a case where the three-dimensional model generation unit 25a generates the three-dimensional model 52 using a Visual SLAM, the plurality of images 63 may be acquired using a monocular camera, a stereo camera, an RGBD camera, or the like.

Further, in the above-described embodiment, an example has been described in which the display unit is configured as the HMD 21, but the present invention is not limited thereto. For example, the display unit may be configured as a glasses-type wearable display device.

Further, in the above-described embodiment, an example has been described in which the control unit 25 associates the inspection position 53, the three-dimensional model position 54, and the inspection result 50 by storing them as one data file 80, but the present invention is not limited thereto. For example, the control unit 25 may be configured in any way as long as the inspection position 53, the three-dimensional model position 54, and the inspection result 50 can be associated with each other. For example, the control unit 25 may be configured to associate the inspection position 53, the three-dimensional model position 54, and the inspection result 50 by assigning a common identifier (ID).

Further, in the above-described embodiment, an example has been described in which the control unit 25 causes the inspection result 50 to be displayed with respect to the inspection target 40 that has failed the inspection, but the present invention is not limited thereto. For example, the control unit 25 may be configured to cause the inspection result 50 to be displayed with respect to the inspection target 40 that has passed the inspection.

Further, in the above-described embodiment, an example has been described in which the external shape inspection unit 25d inspects the state change in the external shape of the inspection target 40 by comparing the three-dimensional design data 56 with the three-dimensional model 52, but the present invention is not limited thereto. For example, the external shape inspection unit 25d may be configured to inspect the state change in the external shape of the inspection target 40 by using moiré, digital image correlation (DIC: Digital Image Correlation), etc., in addition to the comparison between the three-dimensional design data 56 and the three-dimensional model 52.

Further, in the above-described embodiment, an example has been described in which the aircraft inspection support device 100 and the communication device 122 perform radio communication, but the present invention is not limited thereto. For example, it may be configured such that the aircraft inspection support device 100 and the communication device 122 exchange data via a storage medium.

Further, in the above-described embodiment, an example has been described in which the controller box 2a is carried or mounted by the inspector 30, but the present invention is not limited thereto. For example, the controller box 2a may be provided on the inspection unit 10 side. In a case where the controller box 2a is provided on the inspection unit 10 side, the controller box 2a may be integrated with the inspection unit 10 using a band or the like. Further, in a case where an inspection is performed in a state in which the inspection unit 10 is placed on a carriage or the like, the controller box 2a may be arranged on the carriage to which the inspection unit 10 is arranged.

In addition, in the above-described embodiment, an example has been described in which the marker light generation unit 13 emits the marker light at the inspection position 53, but the present invention is not limited thereto. For example, the marker light generation unit 13 may be configured to emit the marker light to the inspection position 53.

Further, in the above-described embodiment, an example has been described in which the marker light generation unit 13 differentiates the emission color of the first marker light and the emission color of the second marker light from each other, but the present invention is not limited thereto. For example, the marker light generation unit 13 may be configured to differentiate the emission pattern of the first marker light and the emission pattern of the second marker light from each other.

Further, in the above-described embodiment, an example has been described in which the inspector 30 performs the inspection by the inspection unit 10 and stores the three-dimensional model position 54, the inspection position 53, and the inspection result 50 in association with each other, but the present invention is not limited thereto. For example, the inspector 30 may visually inspect the inspection target 40. In a case where the inspector 30 visually inspects the inspection target 40, it may be configured such that the inspection position 53 is acquired by irradiating the inspection target 40 with the marker light by the marker light generation unit 13, and the three-dimensional model position 54, the inspection position 53, and the inspection result 50 are stored in association with each other.

Further, in the above-described embodiment, an example has been described in which the plurality of images 63 for generating the three-dimensional model 52 and the image 62 reflected in the visual range of the inspector 30 are acquired by the same imaging unit 22, but the present invention is not limited thereto. The imaging unit for acquiring the plurality of images 63 and the imaging unit for acquiring the image 62 reflected in the visual field may be different from each other. The imaging unit for acquiring the plurality of images 63 may be configured to be portable by the inspector 30. With this configuration, since the inspector can acquire a plurality of images 63 while carrying the imaging unit by the hand, it is possible to improve the working efficiency as compared with the configuration of acquiring a plurality of images 63 by the imaging unit 22 mounted on the head.

Further, in the above-described embodiment, an example has been described in which the communication unit 14 continuously transmits the measurement information image 60 as a moving image to the communication unit 24, but the present invention is not limited thereto. For example, the communication unit 14 may be configured to transmit the measurement information image 60 as a still image to the communication unit 24.

[Aspects]

It will be understood by those skilled in the art that the above-described exemplary embodiments are concrete examples of the following aspects.

(Item 1)

An aircraft inspection support device comprising:

a three-dimensional model generation unit configured to generate a three-dimensional model of a shape of an aircraft by acquiring shape data from a plurality of positions;

an inspection position acquisition unit configured to acquire an inspection position of an inspection target that is a component of the aircraft; and a control unit configured to perform control to acquire an inspection result of the inspection target and cause a three-dimensional model position on the three-dimensional model corresponding to the inspection position, the inspection position, and the inspection result to be stored in association with each other.

(Item 2)

The aircraft inspection support device as recited in the above-described Item 1, further comprising:

a storage unit configured to store the three-dimensional model, the inspection position, and the inspection result, wherein the control unit is configured to perform control to associate the inspection position of the inspection target with the three-dimensional model position and store the three-dimensional model in which the three-dimensional model position and the inspection position are associated with each other in the storage unit.

(Item 3)

The aircraft inspection support device as recited in the above-described Item 2, further comprising:

an imaging unit configured to acquire an inspection image in which a region including the inspection target is imaged, at the time of inspection, wherein the control unit is configured to perform control to acquire the inspection position of the inspection target based on the inspection image and associate the acquired inspection position with the three-dimensional model position.

(Item 4)

The aircraft inspection support device as recited in the above-described Item 3, wherein the control unit is configured to perform control to further cause an inspection determination result of the inspection target in addition to the three-dimensional model position, the inspection position, and the inspection result to be stored in association with the three-dimensional model position, the inspection position, and the inspection result.

(Item 5)

The aircraft inspection support device as recited in the above-described Item 3, further comprising:

a marker light generation unit configured to irradiate or emit marker light indicating the inspection position when capturing the inspection image.

(Item 6)

The aircraft inspection support device as recited in the above-described Item 5, wherein the marker light generation unit is configured to be capable of irradiating or emitting at least first marker light indicating that the inspection target has passed the inspection and second marker light indicating that the inspection target has failed the inspection, with respect to the inspection position of the inspection target.

(Item 7)

The aircraft inspection support device described in the above-described Item 1, wherein the three-dimensional model generation unit is configured to generate the three-dimensional model based on a plurality of images captured while changing an imaging position.

(Item 8)

The aircraft inspection support device as recited in the above-described Item 1, further comprising:

an external shape inspection unit configured to inspect a state change in an external shape of the inspection target based on at least the three-dimensional model.

(Item 9)

The aircraft inspection support device as recited in the above-described Item 8, further comprising:

a design data acquisition unit configured to acquire the three-dimensional design data in an inspection region including at least the inspection target, wherein the external shape inspection unit is configured to inspect the state change in the external shape in the inspection region including the inspection target, based on a comparison between the three-dimensional model generated by the three-dimensional model generation unit and the three-dimensional design data acquired by the design data acquisition unit.

(Item 10)

The aircraft inspection support device as recited in the above-described Item 9, wherein the design data acquisition unit is configured to acquire the three-dimensional model generated at the time of producing the aircraft or prior to the inspection, as the three-dimensional design data.

(Item 11)

The aircraft inspection support device as recited n the above-described Item 1, further comprising:

a display unit configured to display an image reflected in a visual range of the subject, wherein the control unit is configured to perform control, based on the image reflected in the visual range and the three-dimensional model in which the three-dimensional model position and the inspection position are associated with each other, to display a past inspection result at least at the time of a last inspection by projecting the past inspection result on an inspection region including the inspection target, or display the past inspection result of the inspection target on the image reflected in the visual range.

(Item 12)

The aircraft inspection support device described in the above-described Item 11, wherein the control unit is configured to perform control, based on the image reflected in the visual range and the three-dimensional model in which the three-dimensional position and the inspection position are associated with each other, to display an uninspected inspection target and an inspected inspection target in a distinguishable manner by projecting the inspection position on the inspection region including the inspection target, or display the uninspected inspection target and the inspected inspection target in a distinguishable manner by displaying the inspection position on the image reflected in the visual range.

(Item 13)

The aircraft inspection support device as recited in the above-described Item 9, further comprising:

a display unit configured to display the image reflected in the visual range of the subject, wherein the control unit is configured to perform control, based on the image reflected in the visual range, the three-dimensional model in which the three-dimensional model position and the inspection position are associated with each other, and the external shape inspection result indicating the state change in the external shape at the inspection position, to display the external shape inspection result by projecting the external shape inspection result at the inspection position in the inspection region including the inspection target, or display the external shape inspection result at the inspection position on the image reflected in the visual range.

(Item 14)

The aircraft inspection support device as recited the above-described Item 11 or 13, wherein the display unit is configured as a head-mounted display for displaying the inspection region including the inspection target and the inspection position of the inspection target.

(Item 15)

The aircraft inspection support device as recited in the above-described Item 11 or 13, wherein the display unit is configured as a portable display device for distinguishably displaying the inspection position on the inspection target on the image reflected in the visual range.

(Item 16)

The aircraft inspection support device as recited in the above-described Item 3, wherein the imaging unit is configured to acquire the inspection image, a plurality of images for generating the three-dimensional model, and the image reflected in the visual range of the subject.

(Item 17)

An aircraft inspection support method, comprising:

generating a three-dimensional model of a shape of an aircraft by acquiring shape data from a plurality of positions;

inspecting an inspection target that is a component of the aircraft;

acquiring an inspection result of the inspection target;

acquiring an inspection position of the inspection target; and storing a three-dimensional model position on the three-dimensional model corresponding to the inspection position, the inspection position, and the inspection result in association with each other.

DESCRIPTION OF SYMBOLS

21: HMD (head-mounted display)(display unit)
22: Imaging unit
25: Control unit
   25a: Three-dimensional model generation unit
   25b: Inspection position acquisition unit
   25c: Design data acquisition unit
   25d: External shape inspection unit
26: Portable display device (display unit)
30: Inspector
40: Inspection target
50: Inspection result
51: Inspection determination result
52: Three-dimensional model
53: Inspection position 54: Three-dimensional model position
55: Three-dimensional design data
56: Three-dimensional design data
57: Past inspection result
58: External shape inspection result
61: Inspection image
62: Image reflected in the visual range of the subject
100: Aircraft inspection support device

The invention claimed is:

1. An aircraft inspection support device comprising:
 a three-dimensional model generation unit configured to generate a three-dimensional model of a shape of an aircraft by acquiring shape data from a plurality of positions;
 an inspection position acquisition unit configured to acquire an inspection position of an inspection target that is a component of the aircraft;
 a control unit configured to perform control to acquire an inspection result of the inspection target and cause a three-dimensional model position on the three-dimensional model corresponding to the inspection position, the inspection position, and the inspection result to be stored in association with each other;
 an imaging unit configured to acquire an inspection image in which a region including the inspection target is imaged, at the time of inspection; and
 a marker light generation unit configured to irradiate or emit marker light indicating the inspection position when capturing the inspection image,
 wherein the control unit is configured to perform control to acquire the inspection position of the inspection target based on the inspection image and associate the acquired inspection position with the three-dimensional model position.

2. The aircraft inspection support device as recited in claim 1, further comprising:
 a storage unit configured to store the three-dimensional model, the inspection position, and the inspection result,
 wherein the control unit is configured to perform control to associate the inspection position of the inspection target with the three-dimensional model position and store the three-dimensional model in which the three-dimensional model position and the inspection position are associated with each other in the storage unit.

3. The aircraft inspection support device as recited in claim 1,
 wherein the control unit is configured to perform control to further cause an inspection determination result of the inspection target in addition to the three-dimensional model position, the inspection position, and the inspection result to be stored in association with the three-dimensional model position, the inspection position, and the inspection result.

4. The aircraft inspection support device as recited in claim 1,
 wherein the marker light generation unit is configured to be capable of irradiating or emitting at least first marker light indicating that the inspection target has passed the inspection and second marker light indicating that the inspection target has failed the inspection, with respect to the inspection position of the inspection target.

5. The aircraft inspection support device as recited in claim 1,
 wherein the three-dimensional model generation unit is configured to generate the three-dimensional model based on a plurality of images captured while changing an imaging position.

6. The aircraft inspection support device as recited in claim 1, further comprising:
 an external shape inspection unit configured to inspect a state change in an external shape of the inspection target based on at least the three-dimensional model.

7. The aircraft inspection support device as recited in claim 6, further comprising:
 a design data acquisition unit configured to acquire the three-dimensional design data in an inspection region including at least the inspection target,
 wherein the external shape inspection unit is configured to inspect the state change in the external shape in the inspection region including the inspection target, based on a comparison between the three-dimensional model generated by the three-dimensional model generation unit and the three-dimensional design data acquired by the design data acquisition unit.

8. The aircraft inspection support device as recited in claim 7,
 wherein the design data acquisition unit is configured to acquire the three-dimensional model generated at the time of producing the aircraft or prior to the inspection, as the three-dimensional design data.

9. The aircraft inspection support device as recited in claim 7, further comprising:
 a display unit configured to display the image reflected in the visual range of the subject,
 wherein the control unit is configured to perform control, based on the image reflected in the visual range, the three-dimensional model in which the three-dimensional model position and the inspection position are associated with each other, and the external shape inspection result indicating the state change in the external shape at the inspection position, to
 display the external shape inspection result by projecting the external shape inspection result at the inspection position in the inspection region including the inspection target, or
 display the external shape inspection result at the inspection position on the image reflected in the visual range.

10. The aircraft inspection support device as recited claim 9,
 wherein the display unit is configured as a head-mounted display for displaying the inspection region including the inspection target and the inspection position of the inspection target.

11. The aircraft inspection support device as recited in claim 9,
 wherein the display unit is configured as a portable display device for distinguishably displaying the inspection position on the inspection target on the image reflected in the visual range.

12. The aircraft inspection support device as recited in claim 1, further comprising:
 a display unit configured to display an image reflected in a visual range of the subject,
 wherein the control unit is configured to perform control, based on the image reflected in the visual range and the three-dimensional model in which the three-dimensional model position and the inspection position are associated with each other, to display a past inspection result at least at the time of a last inspection by projecting the past inspection result on an inspection region including the inspection target, or display the past inspection result of the inspection target on the image reflected in the visual range.

13. The aircraft inspection support device as recited in claim 12, wherein the control unit is configured to perform control, based on the image reflected in the visual range and the three-dimensional model in which the three-dimensional position and the inspection position are associated with each other, to display an uninspected inspection target and an inspected inspection target in a distinguishable manner by projecting the inspection position on the inspection region including the inspection target, or display the uninspected inspection target and the inspected inspection target in a distinguishable manner by displaying the inspection position on the image reflected in the visual range.

14. The aircraft inspection support device as recited claim 12, wherein the display unit is configured as a head-mounted display for displaying the inspection region including the inspection target and the inspection position of the inspection target.

15. The aircraft inspection support device as recited in claim 12, wherein the display unit is configured as a portable display device for distinguishably displaying the inspection position on the inspection target on the image reflected in the visual range.

16. The aircraft inspection support device as recited in claim 1, wherein the imaging unit is configured to acquire the inspection image, a plurality of images for generating the three-dimensional model, and the image reflected in the visual range of the subject.

17. An aircraft inspection support method, comprising:

generating a three-dimensional model of a shape of an aircraft by acquiring shape data from a plurality of positions;

inspecting an inspection target that is a component of the aircraft;

acquiring an inspection result of the inspection target;

acquiring an inspection position of the inspection target;

storing a three-dimensional model position on the three-dimensional model corresponding to the inspection position, the inspection position, and the inspection result in association with each other;

acquiring an inspection image in which a region including the inspection target is imaged, at the time of inspection;

irradiating or emitting marker light indicating the inspection position when capturing the inspection image; and acquiring the inspection position of the inspection target based on the inspection image when acquiring the inspection position.

* * * * *